US 10,397,048 B2

(12) United States Patent
Kammerer et al.

(10) Patent No.: US 10,397,048 B2
(45) Date of Patent: Aug. 27, 2019

(54) NETWORK SYSTEM FOR RETRIEVAL OF CONFIGURATION RELATED DATA

(71) Applicant: regify S.A., Luxembourg (LU)

(72) Inventors: Kurt Kammerer, Huefingen (DE); Volker Schmid, Blumberg (DE)

( * ) Notice: Subject to any disclaimer, the term of this patent is extended or adjusted under 35 U.S.C. 154(b) by 479 days.

(21) Appl. No.: 14/620,222

(22) Filed: Feb. 12, 2015

(65) Prior Publication Data

US 2015/0229517 A1  Aug. 13, 2015

(30) Foreign Application Priority Data

Feb. 12, 2014  (EP) .................................... 14154813

(51) Int. Cl.
*H04L 12/24* (2006.01)
*H04L 9/32* (2006.01)
*H04L 29/06* (2006.01)

(52) U.S. Cl.
CPC ........ *H04L 41/0803* (2013.01); *H04L 9/3236* (2013.01); *H04L 41/28* (2013.01); *H04L 41/5051* (2013.01); *H04L 63/0815* (2013.01)

(58) Field of Classification Search
CPC . H04L 9/3223; H04L 9/3236; H04L 41/0803; H04L 41/5051; H04L 63/0815
See application file for complete search history.

(56) References Cited

U.S. PATENT DOCUMENTS

| | | |
|---|---|---|
| 8,387,084 B1 | 2/2013 | Klappert et al. |
| 2003/0233329 A1* | 12/2003 | Laraki ................. G06Q 20/123 705/52 |
| 2004/0025056 A1* | 2/2004 | Katsube ................. G06F 21/10 726/7 |

(Continued)

FOREIGN PATENT DOCUMENTS

| | | |
|---|---|---|
| EP | 2650810 A1 | 10/2013 |
| JP | 2007 115229 A1 | 5/2007 |

(Continued)

OTHER PUBLICATIONS

McMillan, A. et al. "Automated Service Configuration draft-daboo-aggregated-service-discovery-03," Jun. 2013.

(Continued)

*Primary Examiner* — Gil H. Lee

(57) ABSTRACT

There is provided a network system comprising, in accordance with an embodiment, a lookup unit, a clearing unit having a storage device and a client unit. The client unit is adapted for providing user-related data to the lookup unit, wherein the user-related data is based on user-specific data, the user-specific data is associated with a user, and the user-related data allows for unambiguous identification of the user-specific data. Further, the lookup unit is adapted for retrieving identification data from the clearing unit by using the user-related data, wherein the identification data is associated with the user-specific data, and the clearing unit is adapted for retrieving from the storage device the identification data associated with the user-specific data. The clearing unit is adapted for providing the identification data to the lookup unit. The lookup unit is adapted for retrieving configuration related data for a service provided to the user, wherein the configuration related data are retrieved by using the identification data.

18 Claims, 5 Drawing Sheets

(56) References Cited

U.S. PATENT DOCUMENTS

| | | | |
|---|---|---|---|
| 2007/0063023 A1 | 3/2007 | Imani | |
| 2009/0094347 A1* | 4/2009 | Ting | G06F 17/30902 709/219 |
| 2011/0078779 A1 | 3/2011 | Liu et al. | |
| 2011/0119747 A1 | 5/2011 | Lambiase | |

FOREIGN PATENT DOCUMENTS

| | | |
|---|---|---|
| JP | 2012 079231 A1 | 4/2012 |
| RU | 2 325 787 C2 | 5/2011 |
| WO | 2011063014 A1 | 5/2011 |

OTHER PUBLICATIONS

Office action for corresponding Russian application 2015 104 560 of Oct. 25, 2018.
English translation of Japanese Examination Report of corresponding JP application JP 2015-023762.
Office Action in corresponding CN application 2015 1007 5407.5 dated Feb. 26, 2019 and English translation thereof.

* cited by examiner

NETWORK SYSTEM FOR RETRIEVAL OF CONFIGURATION RELATED DATA

FIELD OF THE INVENTION

The present invention relates to the field of network systems and in particular to network systems comprising a client unit which requires configuration related data.

BACKGROUND OF THE INVENTION

Usually configuration related data for client units, such as license keys, provider network addresses, login names, customization and corporate identity etc. are provided to a client unit, i.e. to a user operating the client unit, via email.

However, the conventional methods for providing configuration related data sometimes provide little comfort for the user.

In view of the above-described situation, there may be a need for an improved technique that enables to provide a network system with improved characteristics.

SUMMARY OF THE INVENTION

This need may be met by the subject-matter according to the independent claims. Advantageous embodiments of the herein disclosed subject-matter are described by the dependent claims.

According to an embodiment of the herein disclosed subject-matter, a network system is provided, the network system comprising: a lookup unit (e.g. a provider lookup server, herein also referred to as PLS); a clearing unit having a storage device; and a client unit being adapted for providing user-related data to the lookup unit, the user-related data being based on user-specific data (e.g. a first fingerprint of the user-specific data), the user-specific data (e.g. e-mail address, phone number, etc) being associated with a user, and the user-related data (e.g. the first fingerprint of the user-specific data) allowing for unambiguous identification of the user-specific data; the lookup unit (e.g. the PLS) being adapted for retrieving identification data (e.g. a provider ID) from the clearing unit by using the user-related data (e.g. first fingerprint of the user-specific data), the identification data (e.g. provider ID) being associated with the user-specific data (e.g. e-mail address of the user); the clearing unit being adapted for retrieving from the storage device the identification data (e.g. provider ID) associated with the user-specific data; the clearing unit being adapted for providing the identification data (e.g. provider ID) to the lookup unit (e.g. PLS); and the lookup unit (e.g. PLS) being adapted for retrieving configuration related data (provider URL, login name, etc.) for a service provided to a user; the lookup unit being adapted for retrieving the configuration related data (e.g. provider URL) by using the identification data (e.g. provider ID).

This aspect of the herein disclosed subject-matter is based on the idea that by separating the retrieval of configuration related data for a user-specific service and the identification of the corresponding user a network system may be provided which provides a high level of security and user comfort. The separation of the retrieval of configuration related data and the identification of the user may be provided by a lookup unit and a clearing unit according to embodiments of the herein disclosed subject matter. According to an embodiment, the user-specific data identify the user unambiguously. For example, according to an embodiment, the user-specific data may be an email address of the user or a phone number of the user (or fingerprints of such data). However, other user-specific data may also be used in conjunction with embodiments of the herein disclosed subject-matter.

A service provided to a user may be a user-specific service (provided to only a single user) or a provider-specific service (provided to a plurality of users).

According to an embodiment, retrieving the configuration related data by using the identification data is retrieving the configuration related data which are associated with the identification data. The fact that the retrieved configuration related data are associated with the identification data does not necessarily imply that the configuration related data are unambiguously identified by the identification data. Rather, the configuration related data may be unambiguously identified by the identification data and some further data, e.g. the user-related data (e.g. a fingerprint of the user's e-mail address) and/or further user-related data (e.g. a fingerprint of the user's password).

According to an embodiment, the lookup unit is adapted for retrieving the configuration related data locally, i.e. within the lookup unit. According to a further embodiment, the lookup unit is adapted for retrieving the configuration related data from a remote unit.

According to an embodiment, the user-related data is anonymous data, i.e. data which do not allow to reconstruct the user-specific data from the user-related data, at least not with reasonable computation power. For example, according to an embodiment the user-related data is a fingerprint of the user-specific data. This fingerprint of the user-specific data may be referred to as a first fingerprint of the user-specific data. Hence, in accordance with the above specification of the user-related data, the first fingerprint of the user-specific data is based on the user-specific data and the first fingerprint allows for unambiguous identification of the user-specific data. The characteristics of the network system and the security may be increased by using a fingerprint of user-specific data for retrieving configuration related data for a user-specific service. According to another embodiment, user-related data may be an encrypted version of the user-specific data. Other types of user-related data are also possible. However, the use of fingerprints may provide a higher security of the network system.

According to an embodiment, a fingerprint of "input data" is data derived from the input data in an unambiguous way. According to an embodiment, the term "fingerprint" implies the determination of the fingerprint by a mathematical function which reproducibly provides the fingerprint from the input data. In this way the fingerprint allows for unambiguous identification of the fingerprint. According to an embodiment, the fingerprint does not allow to calculate the input data from the fingerprint, at least not with reasonable computation power. For this reason, such a function for determining a fingerprint may be referred to as a one-way function. Typical functions for determination of a fingerprint are so-called hash functions, for example MD5, SHA1, SHA2, etc. It should be understood that the function used to calculate the fingerprint must be available to the units which assess (e.g. verify) the input data based on the fingerprint of the input data. To this end, the function used to calculate the fingerprint may be predetermined (e.g. fixedly defined or stored) in the respective units. According to another embodiment, the function used to calculate the fingerprint may be provided with the same transmission which transmits the fingerprint to a receiving unit or with a separate configuration transmission. According to an embodiment, a fingerprint may be a salted fingerprint which is calculated by combining the input data with a cryptographic salt and calculating the fingerprint of the combination of the salt and the input data (i.e. fingerprint of (salt+input data). According to an embodiment, the user-specific data is input data in the above-mentioned sense. Generally herein, it should be understood that if a salted fingerprint of an input data is used, while the salted fingerprint allows for unambiguous identification of the input data, further the cryptographic salt is necessary in order to actually identify the user-specific data.

According to an embodiment the fingerprint is an iterated fingerprint. For example, an iterated fingerprint may be generated by hashing the input data two or more times. An example of an iterated fingerprint is obtained by combining a salt with the input data and hashing the result repeatedly. For example, a fingerprint of further user-specific data may be a fingerprint of a salted fingerprint of a user's password (=Hash(salt|Hash (password)).

Retrieving identification data from the clearing unit by using the user-related data may be performed in any suitable way, e.g. by providing the user-related data to the clearing unit or by providing data, which is derived from the user-related data, to the clearing unit.

According to an embodiment, the lookup unit is further adapted for providing a fingerprint of the user-specific data to the clearing unit. This fingerprint of the user-specific data which is provided to the clearing unit may be referred to as second fingerprint of the user-specific data. According to an embodiment, the second fingerprint of the user-specific data is based on the first fingerprint of the user-specific data. According to a further embodiment, the second fingerprint allows for unambiguous identification of the user-specific data. It is noted that the term "first fingerprint" is used for the fingerprint sent from the client unit to the lookup unit and the term "second fingerprint" is used for fingerprint sent from lookup unit to the clearing unit. However the use of "first" and "second" in this regard shall not be considered as limiting.

Generally herein the term "is based on" is intended to include the meaning "is different but is derived from" and the meaning "is identical to". In other words, the term "is based on" is to be interpreted as including "is derived from" and "is".

Hence, in an embodiment, the second fingerprint of the user-specific data is the first fingerprint of the user-specific data. In other words, according to an embodiment, the lookup unit may be adapted for receiving the first fingerprint of user-specific data from the client unit and forwarding the first fingerprint of the user-specific data to the clearing unit. According to a further embodiment, the second fingerprint of the user-specific data may be derived from the first fingerprint of the user-specific data.

According to an embodiment, the clearing unit is adapted for selecting from the storage device the identification data associated with the user-specific data by using the second fingerprint of the user-specific data. For example, the clearing unit may have stored in the storage device a plurality of fingerprints of user-specific data (e.g. of a plurality of users) and associated identification data. Hence, in such an embodiment, the identification data may be retrieved by the clearing unit by searching in the storage device for a fingerprint which matches the second fingerprint of the user-specific data and selecting the identification data associated with this matching fingerprint. According to an embodiment, the clearing unit includes a database system which stores in the storage device the first fingerprint of the user-specific data and the associated identification data for a plurality of users. By storing the first fingerprint of the user-specific data, the clearing unit does not need to know the user-specific data as such. This may improve the security of the network system.

Configuration related data may be data necessary for configuring the access of the client unit to a remote unit, e.g. a provider unit. For example, the configuration related data may be information on the domain (e.g. a URL) of a provider unit.

According to an embodiment, the network system comprises a provider unit. According to an embodiment, the provider unit is accessible by the client unit. For example, according to an embodiment, the provider is the provider of the user-specific service the configuration related data is for. According to an embodiment, the lookup unit is adapted for providing the configuration related data to at least one entity that needs to be configured for enabling the client unit to access the provider unit or doing provider specific customization, labeling or displaying. According to a further embodiment, the lookup unit is adapted for providing the configuration related data to the client unit. According to other embodiments, the configuration related data may be provided to a different entity for use by the client unit. According to an embodiment, the configuration related data (e.g. the provider URL) is part of a response transmission provided by the lookup unit, wherein the response transmission further includes a status indicator indicating the status of the user-specific data corresponding to user-related data. For example, according to an embodiment, the status indicator indicates whether or not the user-specific data corresponding to the user-related data (e.g. corresponding to the first fingerprint) have been considered as being valid.

According to an embodiment, the lookup unit is adapted for providing a fingerprint of the user-specific data to the provider unit, e.g. for verification of the correctness of the user-specific data by the provider unit and/or for retrieving the configuration related data from the provider unit. This fingerprint of the user-specific data which is provided from the lookup unit to the provider unit is herein also referred to as third fingerprint. According to an embodiment, the third fingerprint is based on (e.g. derived from or identical to) the first fingerprint of user-specific data. For example, the third fingerprint may be a fingerprint of the first fingerprint. According to another embodiment, the third fingerprint is identical to the first fingerprint. In other words, in such an embodiment the lookup unit is adapted for forwarding the first fingerprint received from the client unit to the provider unit.

According to an embodiment, the provider unit is adapted for providing some status information regarding the validity of the user-specific data to the lookup unit in response to the third fingerprint received from the lookup unit. For example, according to an embodiment, the provider unit is adapted for providing status information, which indicates that the third fingerprint corresponds to valid user-specific data, to the lookup unit if the third fingerprint corresponds to valid user-specific data. Verifying the correctness of the user-specific data may increase the security of the network system.

According to an embodiment, the provider unit is adapted for providing the configuration related data or at least part of the configuration related data in response to receiving the third fingerprint from the lookup unit.

According to a further embodiment, the lookup unit is adapted for retrieving the configuration related data by using the identification data. For example, the lookup unit may use the identification data to identify the provider unit and to transmit to the identified provider unit the third fingerprint of user-specific data. Identifying a provider includes, in an embodiment, retrieval of a network address of the provider unit associated with the provider unit. According to an embodiment, the lookup unit is adapted for retrieving the configuration related data from the provider unit by using the third fingerprint, e.g. by providing the third fingerprint to the provider unit. According to an embodiment, the provider unit includes a storage device or a data base, the storage device or the data base having stored therein identification data and associated network addresses for a plurality of providers.

According to an embodiment, the client unit is adapted for providing further user-related data (e.g. a salted fingerprint of a user password or a fingerprint of a user password) to the lookup unit, the further user-related data being based on further user-specific data (e.g. a user password), the further user-specific data being associated with the user, and the further user-related data allowing for unambiguous identification of the further user-specific data. According to an embodiment, the further user-specific data is a user password of the user. For example, the password may be the password of the user necessary for the user to log in at the provider unit, at a sub-provider unit associated with the provider unit or at a further entity. According to other embodiments, other secrets may be used as further user-specific data.

According to a further embodiment, the further user-related data is a fingerprint of the further user-specific data. This fingerprint of the further user related data provided from the client unit to the lookup unit is also referred to as first fingerprint of the further user-related data in the following. In accordance with embodiments, the first fingerprint of the further user-related data may be a salted fingerprint and/or may be a fingerprint of the user-related data.

By providing the further user-related data to the lookup unit, the security of the network system and its operation may be increased.

According to an embodiment, the lookup unit is adapted for providing data, which is based on the further user-related data, to the provider unit and receiving in response hereto a status information regarding the validity of at least one of the further user-specific data, the further user related data, and the data which is based on the further user-related data). According to an embodiment, the data which is based on the further user-related data is a fingerprint of the further user-specific data. This fingerprint of the further user-related data which is provided from the lookup unit to the provider unit is also referred to as second fingerprint of the further user-related data in the following. According to an embodiment, the second fingerprint of the further user-specific data is based on (e.g. identical to or derived from) the first fingerprint of user-specific data. For example, this second fingerprint may be a fingerprint of the first fingerprint of the further user-specific data. According to another embodiment, the second fingerprint is the first fingerprint. In other words, in such an embodiment the lookup unit is adapted for forwarding the first fingerprint of the further user-specific data received from the client unit to the provider unit. According to an embodiment, the data which is based on the further user-related data as well as the fingerprint of the user-specific data is provided to the provider unit and optionally the provider unit is adapted for providing the configuration related data or at least part of the configuration related data in response to receiving from the lookup unit the data which is based on the further user-related data (e.g. the salted hash of the user's password hash) and the fingerprint of the user-specific data (e.g. the user's e-mail address).

According to an embodiment, the provider unit may be adapted for verification of the validity of the user-specific data and/or further user-specific data. This may be performed in any suitable way. For example, according to an embodiment, the provider unit may have stored the further user-specific data and/or the user-specific data and may be adapted for generating the a respective fingerprint of the user-specific data and/or a respective fingerprint of the further user-specific data. In order to verify validity of the user-specific data, the provider unit may be adapted for comparing the fingerprint of the user-specific data received from the lookup unit with the respective fingerprint of the user-specific data generated by the provider unit. In order to verify validity of the further user-specific data, the provider unit may be adapted for comparing the fingerprint of the further user-specific data received from the lookup unit with the respective fingerprint of the further user-specific data generated by the provider unit. Upon match of the compared fingerprints, the provider unit may provide a status information and/or the configuration related data (the configuration related data may e.g. be associated with the user, the user-specific data and/or the further user-specific data) to the lookup unit. However, it should be understood that any suitable method for verification might be used for verifying that the fingerprint of the further user-specific data provided by the lookup unit corresponds to the further user-specific data stored in the storage device of the provider unit.

While according to an embodiment the provider unit may provide the configuration related data, according to other embodiments, the configuration related data may be stored at a different entity, e.g. at the lookup unit and may be selected upon confirmation of successful verification of the further user-specific data at the provider unit. According to another embodiment, the verification at the provider unit is omitted and the lookup unit may in such a case be adapted to provide the configuration related data upon reception of the provider ID from the clearing unit.

According to an embodiment, retrieving the configuration related data from the provider unit includes providing the fingerprint of the user-specific data and optionally the fingerprint of the further user-specific data to the provider unit and receiving from the provider unit the configuration related data. According to an embodiment, the lookup unit is adapted for not providing the fingerprint of the further user-specific data to the clearing unit. For example, according to an embodiment, the further user-specific data or data derived therefrom are only provided to the provider unit which already has stored therein the further user-specific data or data derived therefrom (e.g. a fingerprint of the user-specific data). In particular in case the further user-specific data is secret data (e.g. a password), the security of the network system is improved by not providing the fingerprint of the further user-specific data to the clearing unit.

According to an embodiment, the provider unit is adapted for retrieving the login name of the user on the basis of the fingerprint of the user-specific data (e.g. from a database of the provider unit). Further, in an embodiment where the further user-specific data is the password of the user at the provider unit, the provider unit may be adapted for verifying the password fingerprint for the selected login. According to an embodiment, the provider unit is adapted for providing the login name associated with the user-specific data and/or the further user-specific data to the lookup unit in response to receiving the data which is based on the user-related data and/or the data which is based on the further user-related data from the lookup-unit.

While in the above there have been described communications between the client unit, the lookup unit, the clearing unit in order to provide the configuration related data for the client unit, in the following the registration of a provider unit to the lookup unit and the clearing unit is described.

According to an embodiment of a second aspect, which is related to the registration of the provider unit at the lookup unit and the clearing unit, the provider unit is adapted for providing a registration request to the lookup unit, the registration request including at least part of the identification data (e.g. a provider ID) and verification-related data (e.g. a fingerprint of a clearing password), wherein the verification-related data are based on verification data (e.g. a clearing password) and wherein the verification-related data allow for unambiguous identification of the verification data; the lookup unit being further adapted for receiving the registration request; and the lookup unit being further adapted for providing the at least part of the provider identification data (e.g. the provider ID) and data which are based on the verification-related data (e.g. a fingerprint of the verification-related data, e.g. a fingerprint of the clearing password) to the clearing unit, e.g. in response to the received registration request.

According to an embodiment, the verification-related data is a fingerprint (e.g. a salted fingerprint) of the verification data. The verification data may e.g. be a clearing secret which is known to the clearing unit and the provider unit that wants to register at the clearing unit. According to an embodiment, the verification data (e.g. clearing secret) is exchanged between the clearing unit and the provider unit by encrypted e-mail or, in another embodiment, manually by phone. According to an embodiment, the verification data is generated by the clearing unit and provided to the provider unit.

According to an embodiment, the data which are based on the verification-related data are a fingerprint of the verification-related data and verification-related data allow for unambiguous identification of the verification data. According to another embodiment, the data which are based on the verification-related data are identical with the verification-related data. In other words, according to an embodiment, the lookup unit is adapted for forwarding the verification-related data to the clearing unit.

According to an embodiment, the registration request includes a provider address under which the provider unit can be contacted. The provider address may be e.g. a unified resource locator (URL) of the provider unit. According to an embodiment, the lookup unit is adapted for storing the at least part of the identification data and the associated provider address.

According to an embodiment, the lookup unit is further adapted for receiving the registration request. Further, according to an embodiment, the lookup unit is configured for storing the at least part of the provider identification data and the associated provider address in a storage device of the lookup unit. In such a case, the lookup unit may provide to the client unit the provider address as configuration related data. Communication with the provider unit for retrieval of configuration related data is not necessary in this case, can however be performed, for example in order to verify the user-specific data and the further user-specific data. Instead of or in addition to provider address, other configuration related data may be included in the registration request and may be stored by the lookup unit or provided to the clearing unit.

According to an embodiment, the lookup unit may be adapted for providing a password to the clearing unit, the password being necessary for the clearing unit to accept the at least part of the provider identification data and the fingerprint of the verification data provided by the lookup unit.

According to an embodiment, the verification data is agreed between the provider unit and the clearing unit before registration of the provider unit at the lookup unit. In this way, the clearing unit may, in an embodiment, calculate a fingerprint of the verification data and compare the result to the fingerprint of the verification data received from the lookup unit. If for example a salted fingerprint is provided by the lookup unit, also the cryptographic salt is provided by the lookup unit so that the clearing unit can calculate the fingerprint of the combined cryptographic salt plus verification data in order to verify the verification data.

According to an embodiment, the clearing unit is adapted for verifying the verification data and providing a status information element to the lookup unit, the status information element indicating whether or not the verification of the verification data was successful.

If the at least part of the provider identification data is complete, i.e. if the provider identification data allows for unambiguous identification of the provider unit, the clearing unit may be adapted in such a case to provide a status information element to the lookup unit, the status information element indicating whether or not the verification of the verification data was successful.

According to an embodiment, only part of the provider identification data is provided by the provider unit to the lookup unit and hence only this part of the provider identification data is provided by the lookup unit to the clearing unit. In this way, the lookup unit need not to know the whole provider identification data for registering the provider unit at the clearing unit. This can improve the security of the whole network system. In an implementation of the herein disclosed subject-matter where only part of the provider identification data is provided to the clearing unit by the lookup unit, the clearing unit may be adapted for completing the provider identification data and for providing the completed provider identification data or the missing part of the provider identification data to the lookup unit if the verification of the verification data is successful.

According to an embodiment, the clearing unit is adapted for providing an error information element to the lookup unit in case an error occurs during looking up the provider identification data and/or verifying the verification data. Furthermore, according to an embodiment, the clearing unit is adapted for providing an information element to the lookup unit in case the verification of the verification data failed, wherein the information element indicates to the lookup unit that the fingerprint of the verification data was invalid.

According to an embodiment, the lookup unit is adapted for storing the identification data (e.g. the provider identification data) and the associated configuration related data (e.g. an associated provider URL) in the storage device of the lookup unit.

According to an embodiment of a third aspect, a client unit of a network system is provided, the client unit being adapted for initiating a configuration of a provided to a user by providing user-related data to a lookup unit, wherein user-related data is associated with the user, the user-related data is based on user-specific data, and the user-related data allows for unambiguous identification of the user-specific data.

According to embodiments of the third aspect, the client unit is adapted for providing the functionality of one or more of the aforementioned embodiments and/or for providing the functionality as required by one or more of the aforementioned embodiments, in particular of the embodiments of the first and the second aspect. Moreover, according to an embodiment, the client unit according to the third aspect is adapted as described with regard to one or more of the embodiments of the first and the second aspect.

According to an embodiment of a fourth aspect, a lookup unit of a network system is provided, the lookup unit being adapted for receiving user-related data from a client unit, wherein the user-related data is based on user-specific data, the user-specific data is associated with a user, and the user-related data allows for unambiguous identification of the user-specific data; the lookup unit being adapted for retrieving identification data (e.g. a provider ID) from a clearing unit by using the user-related data (e.g. a fingerprint of an e-mail address of the user), the identification data being associated with the user-specific data; the lookup unit being adapted for retrieving configuration related data for a service provided to the user; the lookup unit being adapted for retrieving the configuration related data by using the identification data.

According to embodiments of the fourth aspect, the lookup unit is adapted for providing the functionality of one or more of the aforementioned embodiments and/or for providing the functionality as required by one or more of the aforementioned embodiments, in particular of the embodiments of the first and the second aspect. Moreover, according to an embodiment, the lookup unit according to the fourth aspect is adapted as described with regard to one or more of the embodiments of the first and the second aspect. For example, according to an embodiment, the lookup unit is adapted for receiving a fingerprint of user-specific data, wherein the user-specific data are associated with a user and the fingerprint of the user-specific data allows for unambiguous identification of the user-specific data; wherein the lookup unit is further adapted for retrieving the configuration related data by using the fingerprint of the user-specific data. For example, according to an embodiment, the lookup unit is adapted for retrieving the configuration related data from a provider unit by using the fingerprint of the user-specific data.

According to an embodiment of a fifth aspect of the herein disclosed subject-matter, a clearing unit of a network system is provided, the clearing unit comprising a storage device and the clearing unit being adapted for receiving user-related data from a lookup unit of the network system, wherein the user-related data is based on user-specific data, the user-specific data is associated with a user, and the user-related data allows for unambiguous identification of the user-specific data; the clearing unit being adapted for retrieving from the storage device the identification data associated with the user-specific data; and the clearing unit being further adapted for providing the identification data to the lookup unit.

According to embodiments of the fifth aspect, the clearing unit is adapted for providing the functionality of one or more of the aforementioned embodiments and/or for providing the functionality as required by one or more of the aforementioned embodiments, in particular of the embodiments of the first aspect and the second aspect. Moreover, according to an embodiment, the clearing unit according to the fifth aspect is adapted as described with regard to one or more of the embodiments of the first and the second aspect.

For example, according to an embodiment of the fifth aspect a clearing unit of a network system is provided, the clearing unit being adapted for receiving a fingerprint of user-specific data from a lookup unit, wherein the user-specific data are associated with the user and the fingerprint of the user-specific data allows for unambiguous identification of the user-specific data; wherein the clearing unit is further adapted for retrieving provider identification data associated with the received fingerprint of the user-specific data, wherein the provider identification data identify a provider unit. According to an embodiment, the provider unit is adapted for providing a user-specific service to the user.

According to a sixth embodiment of the herein disclosed subject-matter, a provider unit of a network system is provided, the provider unit being adapted for receiving user-related data from a lookup unit of the network system, wherein the user-related data is based on user-specific data, the user-specific data is associated with a user, and the user-related data allows for unambiguous identification of the user-specific data; the provider unit being adapted for verifying validity of the user-specific data by using the received user-related data; the provider unit being adapted for verifying validity of the user-specific data by using the received user-related data and/or retrieving configuration related data for a service provided to the user.

According to an embodiment, the provider unit is adapted for providing a status information to the lookup unit, the status information being indicative of a validity of the user-specific data corresponding to the fingerprint.

According to a further embodiment, the provider unit is adapted for providing the configuration related data to the lookup unit.

According to embodiments of the sixth aspect, the provider unit is adapted for providing the functionality of one or more of the aforementioned embodiments and/or for providing the functionality as required by one or more of the aforementioned embodiments, in particular of the embodiments of the first and the second aspect. Moreover, according to an embodiment, the provider unit according to the sixth aspect is adapted as described with regard to one or more of the embodiments of the first and the second aspect.

For example, according to an embodiment, the provider unit is adapted for receiving a fingerprint of user-specific data, wherein the user-specific data are associated with the user and the fingerprint of the user-specific data allows for unambiguous identification of the user-specific data; the provider unit being further adapted for retrieving the configuration related data by using the fingerprint of user-specific data, the configuration related data being associated with the user-specific data.

According to a seventh aspect of the herein disclosed subject-matter, a method of operating a client unit of a network system is provided, the method comprising: initiating a configuration of a service provided to a user by providing user-related data to a lookup unit, wherein user-related data is associated with the user, the user-related data is based on user-specific data, and the user-related data allows for unambiguous identification of the user-specific data.

According to embodiments of the seventh aspect, the method is adapted for providing the functionality of one or more of the aforementioned embodiments and/or for providing the functionality as required by one or more of the aforementioned embodiments, in particular of the embodiments of the first, the second, the third and the fourth aspect.

For example, according to embodiments of the seventh aspect the method comprises providing a fingerprint of user-specific data to a lookup unit, wherein the user-specific data are associated with a user and the fingerprint of the user-specific data allows for unambiguous identification of the user-specific data; and receiving configuration related data for a service provided to the user from the lookup unit.

According to an embodiment of an eighth aspect of the herein disclosed subject-matter a method of operating a lookup unit of a network system is provided, the method comprising: receiving user-related data from a client unit, wherein the user-related data is based on user-specific data, the user-specific data is associated with a user, and the user-related data allows for unambiguous identification of the user-specific data; retrieving identification data (provider ID) from a clearing unit by using the user-related data (fingerprint of e-mail address), the identification data being associated with the user-specific data; retrieving configuration related data for a service provided to the user; the retrieving of the configuration related data being performed by using the identification data.

According to embodiments of the eighth aspect, the method is adapted for providing the functionality of one or more of the aforementioned embodiments and/or for providing the functionality as required by one or more of the aforementioned embodiments, in particular of the embodiments of the first and the second aspect of the herein disclosed subject-matter.

For example, according to embodiments of the eighth aspect the method comprises: receiving a fingerprint of user-specific data from the client unit, wherein the user-specific data are associated with a user and the fingerprint of the user-specific data allows for unambiguous identification of the user-specific data; retrieving provider identification data from the clearing unit by using the fingerprint of the user-specific data, the identification data being associated with the user-specific data; retrieving the configuration related data for a service provided to the user; wherein the retrieving of the configuration related data is performed by using the provider identification data.

According to an embodiment of a ninth aspect of the herein disclosed subject-matter, a method of operating a clearing unit of a network system is provided, the method comprising receiving user-related data from a lookup unit of the network system, wherein the user-related data is based on user-specific data, the user-specific data is associated with a user, and the user-related data allows for unambiguous identification of the user-specific data; retrieving identification data associated with the user-specific data; providing the identification data to the lookup unit.

According to embodiments of the ninth aspect, the method is adapted for providing the functionality of one or more of the aforementioned embodiments and/or for providing the functionality as required by one or more of the aforementioned embodiments, in particular of the embodiments of the first and the second aspect of the herein disclosed subject-matter.

For example, according to embodiments of the ninth aspect the method comprises receiving a fingerprint of user-specific data from a lookup unit, wherein the user-specific data are associated with a user and the fingerprint of the user-specific data allows for unambiguous identification of the user-specific data; retrieving provider identification data associated with the fingerprint of the user-specific data, wherein the provider identification data identify a provider unit; and providing the provider identification data to the lookup unit.

According to an embodiment of a tenth aspect of the herein disclosed subject-matter, a method of operating a provider unit of a network system is provided, the method comprising: receiving user-related data from a lookup unit of the network system, wherein the user-related data is based on user-specific data, the user-specific data is associated with a user, and the user-related data allows for unambiguous identification of the user-specific data; verifying validity of the user-specific data by using the received user-related data and/or retrieving configuration related data for a service provided to the user; and optionally providing a status information and/or the configuration related data to the lookup unit, the status information being indicative of a validity of the user-specific data corresponding to the fingerprint.

According to embodiments of the tenth aspect, the method is adapted for providing the functionality of one or more of the aforementioned embodiments and/or for providing the functionality as required by one or more of the aforementioned embodiments, in particular of the embodiments of the first and the second aspect of the herein disclosed subject-matter.

For example, according to embodiments of the tenth aspect, the method comprises receiving a fingerprint of the user-specific data from the lookup unit, wherein the user-specific data are associated with a user and the received fingerprint of the user-specific data allows for unambiguous identification of the user-specific data; verifying validity of the received fingerprint of the user-specific data; and providing a status information to the lookup unit if the information element corresponds to a valid user-specific data, the status information indicating that the information element corresponds to valid user-specific data.

According to an embodiment of a eleventh aspect of the herein disclosed subject-matter, a method of operating a network system is provided, the network system comprising a lookup unit, a clearing unit and a client unit, and the method comprising: providing user-related data from the client unit to the lookup unit, the user-related data being based on user-specific data, the user-specific data being associated with a user, and the user-related data allowing for unambiguous identification of the user-specific data; operating the lookup unit so as to retrieve identification data (e.g. a provider ID) from the clearing unit by using the user-related data (e.g. a fingerprint of an e-mail address of the user), the identification data being associated with the user-specific data; operating the clearing unit so as to retrieve identification data associated with the user-specific data; providing the identification data from the clearing unit to the lookup unit; operating the lookup unit so as to retrieve configuration related data for a service provided to the user; operating the lookup unit so as to retrieve the configuration related data by using the identification data.

According to embodiments of the eleventh aspect, the method is adapted for providing the functionality of one or more of the aforementioned embodiments and/or for providing the functionality as required by one or more of the aforementioned embodiments, in particular of the embodiments of the first to tenth aspect of the herein disclosed subject-matter.

For example, according to embodiments of the eleventh aspect, the method comprises providing a fingerprint of the user-specific data from the client unit to the lookup unit, wherein the user-specific data are associated with a user and the fingerprint of the user-specific data allows for unambiguous identification of the user-specific data; operating the clearing unit so as to retrieve provider identification data associated with the fingerprint of the user-specific data; and operating the lookup unit so as to retrieve configuration related data associated with the provider identification data by using the fingerprint of the user-specific data.

According to an embodiment of a twelfth aspect of the herein disclosed subject-matter, a computer program is provided, the computer program being adapted for controlling (e.g. carrying out) the method according to one or more embodiments of the seventh, the ninth, the tenth and/or the eleventh aspect if the computer program is executed by a processor device. In particular, for each method disclosed herein, a respective computer program may be provided which is adapted for, when executed by a processor device, controlling the respective method.

As used herein, reference to a computer program is intended to be equivalent to a reference to a program element and/or a computer readable medium containing instructions for controlling a computer system to effect and/or coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The herein disclosed subject matter may be realized by means of a computer program respectively software. However, the herein disclosed subject matter may also be realized by means of one or more specific electronic circuits respectively hardware. Furthermore, the herein disclosed subject matter may also be realized in a hybrid form, i.e. in a combination of software modules and hardware modules.

For example, each unit disclosed herein may be implemented in software and/or hardware, e.g. by a respective device or by a service running on a computer. A device may be a computer, e.g. a server having software running thereon which provides the described functionality of the unit. Generally, a device may be e.g. a processor device having a at least one processor for carrying out instructions in order to provide functions as described with regard to embodiments of the respective entity.

According to an embodiment, the functionality of the units disclosed herein, for example of the client unit, the lookup unit, the clearing unit and the provider unit, may be implemented by means of a respective software component, e.g. a PHP component.

In the above there have been described and in the following there will be described exemplary embodiments of the subject matter disclosed herein with reference to a network system, the individual units thereof and respective methods of operation. It has to be pointed out that of course any combination of features relating to different aspects of the herein disclosed subject matter is also possible. In particular, some features have been or will be described with reference to apparatus type embodiments whereas other features have been or will be described with reference to method type embodiments. However, a person skilled in the art will gather from the above and the following description that, unless other notified, in addition to any combination of features belonging to one aspect also any combination of features relating to different aspects or embodiments, for example even a combinations of features of apparatus type embodiments and features of the method type embodiments is considered to be disclosed with this application.

According to respective exemplary embodiments, the user specific data is the e-mail address of the user; the further user specific data is a fingerprint of a salted fingerprint of a user password, wherein the salted fingerprint of the user password is the user password combined with a cryptographic salt and the client unit is adapted for providing the cryptographic salt to the lookup unit; the configuration related data includes a unified resource locator (URL) of the provider unit and a login name of the user at the provider unit; the user-related data provided from the client unit to the lookup unit is transmitted to lookup unit in a lookup request, wherein the optionally this user-related data is fingerprint of the user-specific data and the lookup request optionally further includes a salted fingerprint of a fingerprint of a user password required for the user to login to a service of the provider unit, and the cryptographic salt used to generate the salted fingerprint; the user-related data provided from the lookup unit to the clearing unit is transmitted to clearing unit in a request transmission, wherein the optionally this user-related data is fingerprint of the user-specific data and the request transmission optionally further includes a password for login to the clearing unit; the user-related data provided to the provider unit is transmitted to the provider unit in a provider request, wherein optionally this user-related data optionally includes the fingerprint of the user-specific data and the provider request optionally includes the salted fingerprint of a fingerprint of a user password required for the user to login to a service of the provider unit, and the cryptographic salt used to generate the salted fingerprint.

Responses to the requests (lookup request, request transmission, provider request) may be provided by the responding unit in a respective response transmission.

According to an embodiment, the units, which communicate with each other according to embodiments of the herein disclosed subject matter, are communicatively coupled via any suitable connection/protocol, e.g. via a secured connection over which the element is transmitted in encrypted form, such as a virtual private network connection (VPN connection) or a secure socket layer connection (SSL connection). It should be understood that—as usual—providing of an element (e.g. a fingerprint of user-specific data) over a secured connection from a sending unit to a receiving unit implicitly discloses encrypting the element, transmitting the encrypted element from the sending unit to the receiving unit and decrypting the encrypted element at the receiving unit to make the element available at the receiving unit. Herein, the sending unit and the receiving unit may be any suitable unit as disclosed herein. It is noted that any communication between units as disclosed herein may be a communication over a secured connection between the units.

It should be understood that a disclosure of a communication between different units implicitly discloses the transmittance, reception and retrieval of respective transmissions by the involved units and vice versa. For example, the disclosure of receiving some input data and providing in response hereto some return data implicitly discloses the retrieval of the return data by providing the input data, the sending of the input data, the receiving of the return data, etc. Further each transmission from a first unit to another, second unit may include an operation identifier which specifies an operation to be carried out by the second unit. Further, the disclosure of providing response data, e.g. a status information, an identity, configuration related data, etc., from a first unit to a second unit is considered to disclose, according to an embodiment, that the second unit which receives the response data is adapted to provide a respective request to the first unit and that the first unit is adapted to receive the request and provide in response hereto the response data.

According to an embodiment, providing the response data implies providing the response data with a predetermined delay. In this way, brute force and timing attacks to the respective unit which transmits the response data may be prevented and thus the security of the network system be increased.

Generally herein "providing data" includes providing the data in unencrypted form or providing the data in encrypted form. Anyway, "providing data" refers generally to provide the data in a representation that allows to reconstruct the data in its original form from the representation.

Further, if a first entity (e.g. the identification data) is specified herein as being associated with a second entity (e.g. the user-specific data), according to an embodiment the term "associated with" also includes an association of the first entity and the second entity in the sense that from the first entity related data (e.g. a fingerprint) can be derived which are assigned to the second entity, e.g. by means of a database.

Whenever an action or method performed by a unit is disclosed herein, it should be understood that according to an embodiment the unit is adapted for performing the action or the method.

The clearing unit and the lookup unit are different from each other. However, despite being different units, according to an embodiment the clearing unit and the lookup unit are provided in a single device. For the clearing unit and the lookup unit may be two different software components running on a single processor device. Further, in another embodiment, one of the clearing unit and the lookup unit may be a software component running in a virtual machine, the virtual machine running on the processor device. The other of the clearing unit and the lookup unit may be a software component running directly on the processor device or in a further, different virtual machine. According to a further embodiment, the clearing unit and the lookup unit may be spatially remote from each other.

An exemplary implementation of the herein disclosed subject matter may include the following features (e.g. in the form of the exemplary processes (A), (B)):

(A) PLS process (done each time configuration related data is required by the client unit)
1. The client unit generates the first fingerprint of the user-specific data and the first fingerprint of the further user-specific data and sends this to the PLS.
2. The PLS uses the first fingerprint of the user-specific data to get the numeric provider ID of the user's provider from the clearing.
3. The PLS uses its own database to determine the URL of the assigned provider.
4. The PLS contacts the provider (by using the URL) and sends the first fingerprint of the user-specific data and the first fingerprint of the further user-specific data and used salt.
5. The provider verifies the data (user with such e-mail address fingerprint exists and with the given salt the users password fingerprint matches the given one). Result is "OK" with URL to contact the provider or "INVALID". This might be different because of sub-providers. The provider determines the correct URL (e.g. https://portal.regify.com) out of his user database.
6. The PLS returns to the client unit the URL to use.
7. The client unit contacts the provider at the given URL to get the desired information (e.g. the client's configuration).

Finally, the PLS still does not know the users password or the e-mail address. The clearing does not know the users e-mail address.

(B) PLS registration process (done at least once for each new provider):

The PLS learns the association between provider ID and the correct URL by registering. For this process:
1. The provider unit calls the PLS together with his URL, ID, a fingerprint of his clearing password (clearing Password) and the used salt. fingerprint=Hash(salt-|clearingPassword)
2. The PLS verifies this information with the clearing unit by sending the provider ID and the fingerprint to the clearing.
3. If this was successful the PLS updates his database. Now he knows the provider ID and its associated URL (needed for above step 3 and 4).

Finally, the PLS does not know the providers clearing password but now has an association of provider ID and URL which is proven by the clearing.

The aspects and embodiments defined above and further aspects and embodiments of the herein disclosed subject matter are apparent from the examples to be described hereinafter and are explained with reference to the drawings, but to which the invention is not limited.

DETAILED DESCRIPTION OF EXEMPLARY EMBODIMENTS

Figure 1:
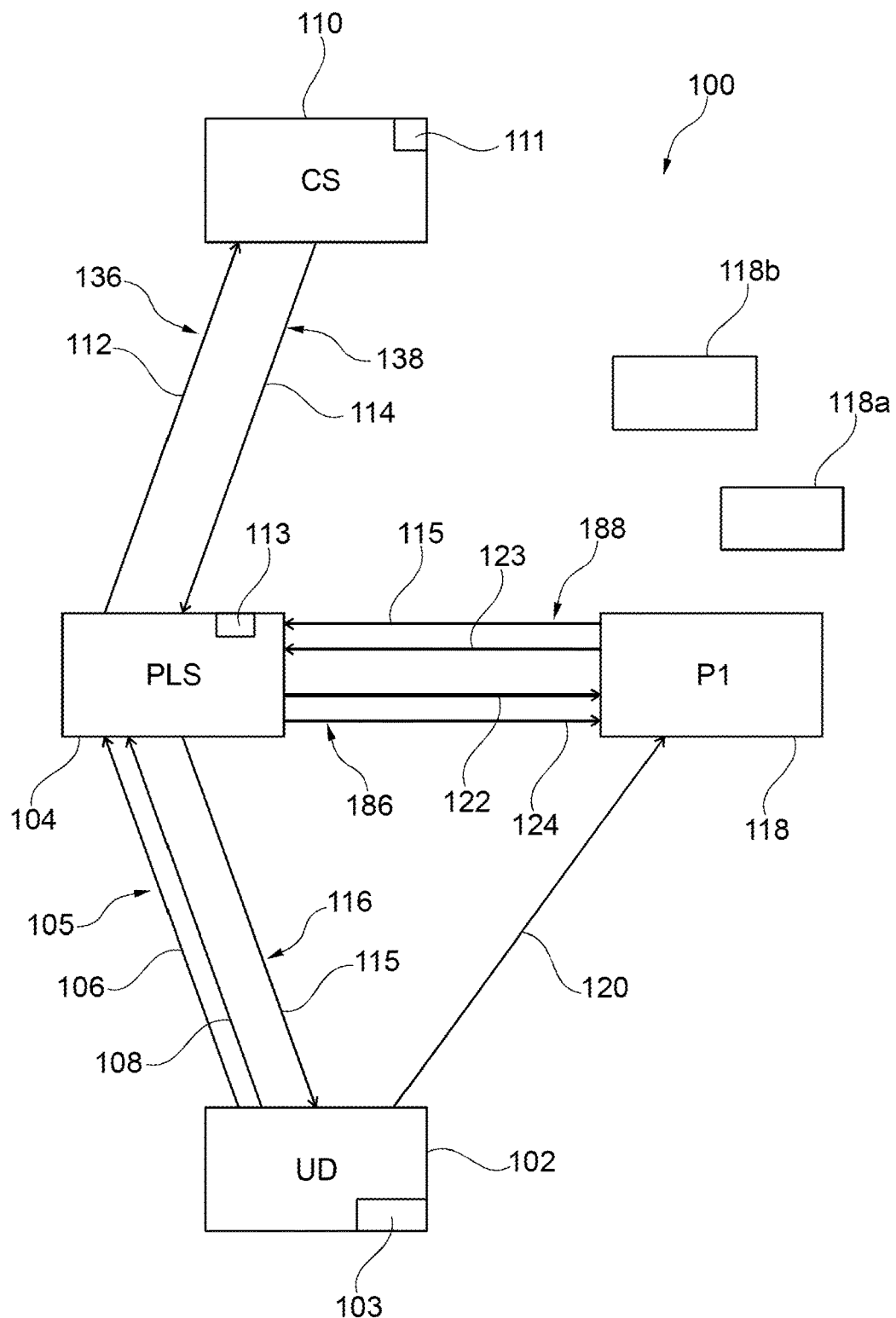
FIG. 1 shows a network system in accordance with embodiments of the herein disclosed subject-matter.

The illustration in the drawings is schematic. It is noted that in different figures, similar or identical elements are provided with the same reference signs or with reference signs, which are different from the corresponding reference signs only by an appended character.

FIG. 1 shows a network system 100 in accordance with embodiments of the herein disclosed subject-matter.

According to an embodiment, the network system 100 comprises a client unit 102 such as a user device (UD). Further the network system 100 comprises a lookup unit 104, for example a lookup server (which may also be referred to as provider lookup server, PLS). The client unit 102 is adapted for providing user-related data 106 in the form of a fingerprint of user-specific data to the lookup unit 104. The user-specific data are associated with a user, e.g. the user which operates the client unit, and the fingerprint 106 allows for unambiguous identification of the user-specific data. For example, the fingerprint may be a hash code (e.g. a cryptographic hash code) of the user-specific data obtained by a respective hash function.

The hash code may be generated from the user-specific data by any suitable hash function, a plurality of which is known in the art (e.g. MD5, secure hash algorithms such as SHA-x, see e.g. Federal information processing standards publication (FIPS PUB) 180-2, available from http://csrc- .nist.gov/publications/, however other functions for generating a fingerprint according to embodiments of the herein disclosed subject matter may also be used). In an advantageous embodiment the fingerprint is generated by a cryptographic hash function.

In accordance with a further embodiment, the client unit 102 is adapted for providing a further user-related data 108 in the form of a fingerprint of further user-specific data to the lookup unit 104, wherein the fingerprint 108 of the further user-specific data allows for unambiguous identification of the further user-specific data. According to an embodiment, the user-specific data is the email address of the user of the client unit 102 and the further user-specific data is the password of the user. Hence, while in the following reference is made to the email address and the password of the user, it should be understood that any of the embodiments given below may generally be implemented by using any user-specific data and any further user-specific data. According to an embodiment at least one of the user-specific data and the further user-specific data unambiguously identifies the user.

According to an embodiment, the client unit 102 includes an input device 103 which can be operated by the user to input the user-specific data and the further user-specific data into the client unit 102. According to an embodiment, the client unit 102 is adapted to generate the fingerprint 106 of the user-specific data by using a secure hash algorithm. According to an embodiment, the client unit 102 is adapted to generate the fingerprint 108 of the further user-specific data by using a secure hash algorithm.

In accordance with an embodiment, the fingerprint 108 of the password is a salted fingerprint. As is known in the art, this means that for example if a hash function is used for generating the fingerprint, not the password alone is provided to the hash function as an input but rather the password plus a cryptographic salt is used as input to the hash function. In other words, the salted fingerprint of the password is the fingerprint of a combination of the password and the cryptographic salt. According to a further embodiment, the salted fingerprint of the password is the fingerprint of a combination of the cryptographic salt and the fingerprint of the password. Further, it should be understood that generating the fingerprint, salting the fingerprint and generating a salted fingerprint of the combination of the salt and the previous fingerprint could be iterated two or more times as is known in the art in order to improve the security by making it infeasible for a third person to try to generate the fingerprint of the password by calculating fingerprints for a plurality of estimated passwords.

The client unit 102 is adapted for providing the fingerprint 106 of the user-specific data as well as the fingerprint 108 of the further user-specific data to the lookup unit 104. According to an embodiment, the fingerprint 106 and the fingerprint 108 are provided to the client unit in a common registration request 105.

In accordance with an embodiment, the network system 100 comprises a clearing unit 110, e.g. a clearing server (CS). According to an embodiment, the lookup unit 104 is adapted for requesting identification data, e.g. provider information of a provider of the user from the clearing unit 110. For example, according to an embodiment, the lookup unit 104 is adapted for providing a further fingerprint 112 (e.g. a second fingerprint) of the user-specific data to the clearing unit, wherein the further fingerprint 112 of the user-specific data allows for unambiguous identification of the user-specific data. According to an embodiment, the further fingerprint 112 of the user-specific data is identical to the fingerprint 106 of the user-specific data. In other words, in this embodiment, the fingerprint of the user-specific data which the lookup unit receives from the client unit 102 is forwarded by the lookup unit 104 to the clearing unit 110 as the further fingerprint 112 of the user-specific data. The further fingerprint 112 may be provided to the clearing unit 110 in a request transmission 136 requesting the identification data associated with the further fingerprint 112.

In response to receiving the further fingerprint 112 of the user-specific data, the clearing unit 110 provides the identification data 114 to the lookup unit, e.g. in a response transmission 138. According to an embodiment, the clearing unit 110 retrieves the identification data 114, which are associated with the user-specific data, from a storage device 111 of the clearing unit 110. According to an embodiment, the storage device 111 has stored therein an identifier of the user-specific data, e.g. the fingerprint 106 and the associated identification data 114 for a plurality of users. These data may be stored in the storage device during a registration of a provider unit wherein the provider unit provides the data to be stored in the storage device 111.

According to an embodiment, the identification data 114 unambiguously identifies the provider unit associated with the user-specific data (e.g. provider unit 118 shown in FIG. 1). For example, according to an embodiment, the identification data 114 identifies the provider unit which hosts the email account of the user which is associated with the email address which forms the user-specific data in an embodiment.

According to an embodiment, the lookup unit 104 is adapted for retrieving the configuration related data 115 associated with the provider identification information 114 by using the identification data 114. According to an embodiment, the lookup unit 104 retrieves a provider address associated with the provider identification information, e.g. from a storage device 113 of the lookup unit 104. The provider address may be a Unified Resource Locator (URL) under which the respective provider unit can be accessed by the user device 102. According to an embodiment, the lookup unit has stored in the storage device 113 provider identification information and corresponding provider address, e.g. provider URL, for a plurality of providers. According to an embodiment, the lookup unit 104 is adapted for retrieving configuration related data 115 (e.g. login name and/or network address of a sub-provider which can be directly contacted by the client unit 102) by using the identification data 114. According to an embodiment the lookup unit 104 receives the configuration related data 115 from the provider unit as shown in FIG. 1, or, according to another embodiment (not shown in FIG. 1), from the clearing unit 110 e.g. together with the provider identification information 114.

In order to improve security, according to an embodiment, the lookup unit 104 is adapted for validating the user-related data and/or the further user-related data before providing the configuration related data 115 to the client unit 102. To this end, according to an embodiment, the lookup unit 104 is adapted for providing a further fingerprint (e.g. a third fingerprint 122) of the user-specific data and/or a further fingerprint (e.g. a second fingerprint 124) of the further user-specific data to the first provider unit 118 identified by the identification data 114, e.g. in a provider request 186 from the lookup unit 104 to the first provider unit 118. According to an embodiment, in response to receiving the third fingerprint 122 of the user-specific data and the second fingerprint 124 of the further user-specific data, the first provider unit 118 verifies validity of the further (third)

fingerprint 122 of the user-specific data and/or the further (second) fingerprint 124 of the further user-specific data. To this end, the first provider unit is according to an embodiment adapted for calculating the third fingerprint of the user-specific data and the second fingerprint of the further user-specific data from the user-specific data and/or the further user-specific data stored in a storage device of the first provider unit 118 and comparing the calculated fingerprint(s) to the respective fingerprint(s) 122, 124 received from the lookup unit 104. Upon match of the calculated and the respective received fingerprint 122, 124, the received fingerprint 122, 124 is considered to be valid. It should be understood that the first provider unit 118, in order to perform this calculation of the fingerprint(s), needs to know how the received fingerprints 122, 124 have been generated. However, this is easy to fulfil e.g. by a static implementation of the method of calculation of the respective fingerprint in each unit involved. Hence, according to an embodiment it should be understood that the implementation of the respective units of the network system 100 requires knowledge of the operation of the respective other units. In a further embodiment, the respective transmissions between the units 102, 104, 110, 118 of the network system indicate how the respective fingerprint is calculated. For example, the respective transmission may indicate that the fingerprint provided in the transmission is calculated by using a SHA-256 algorithm. According to a further embodiment, a transmission between two units 102, 104, 110, 118 may include a cryptographic salt where a salted fingerprint is used. According to a further embodiment, the transmissions between the units 102, 104, 110, 118 indicate the number of repetitions of fingerprint calculation. Further, each transmission between units 102, 104, 110, 118 may be performed by transmission of respective data structures. Such data structures may be given for example in JavaScript Object Notation (JSON). In such a data structure, every element or parameter of the transmission (e.g. a parameter that is needed to perform a requested operation, which may include the calculation of a fingerprint) may be defined by a field of the data structure and a respective value of the parameter is provided to the receiving unit of the transmission with the data structure having the respective values in the fields of the data structure.

According to an embodiment, a request transmission sent from a sending unit to a receiving unit is considered a transmission which requests the receiving unit to carry out some operation. In response the request transmission, the receiving unit may return a response transmission indicating a result of the operation carried out.

According to an embodiment, if the further fingerprint of the user-specific data and the further fingerprint of the further user-specific data correspond to valid user-specific data and/or valid further user-specific data, according to an embodiment, the first provider unit 118 provides a status information 123 to the lookup unit. According to an embodiment, the lookup unit 104 is adapted for providing the configuration related data 115 to the client unit 102 if the status information 123 from the first provider unit indicates that the user-specific data and the further user-specific data of the respective fingerprints provided by the client unit 102 are valid. According to an embodiment, the first provider unit 118 further provides the configuration related data 115 to the lookup unit 104. The status information 123 and the configuration related data 115 may be provided to the lookup unit 104 in a response transmission 188. The configuration related data 115 may be provided to the client unit 104 in a respective response transmission 116.

Hence, the configuration related data 115 (which may include e.g. the provider URL, the sub-provider URL, login name of the user, etc.) may be used by the client unit 102 together with the user's known login data, e.g. the password of the user, to log in at the respective provider, e.g. the first provider 118 shown in FIG. 1 (or a sub-provider thereof, if such a sub-provider is specified in the configuration related data 115). The access of the lookup unit 102 to the first provider 118 is indicated at 120 in FIG. 1.

It should be noted that according to an embodiment, the network system 100 comprises a plurality of provider units, including the first provider unit 118 and further provider units, two of which are indicated at 118a, 118b. Further, according to an embodiment two or more lookup units may be provided in the network system 100. Further, according to an embodiment two or more clearing units may be provided in the network system 100. It should be understood that the respective provider unit 118, 118a, 118b is contacted by the lookup unit 104 depending on the provider identification data 114 received from the clearing unit 110. Each provider unit 118, 118a, 118b may be e.g. a provider server, P1, P2, P3. According to an embodiment the lookup unit registers itself at all known provider units 118, 118a, 118b. The provided units may be available through a predefined URL's, e.g. URLs at pls1.regify.com, pls2.regify.com and pls3.regify.com. However, in other embodiments registration of the lookup unit is performed in any other suitable way.

Figure 2:
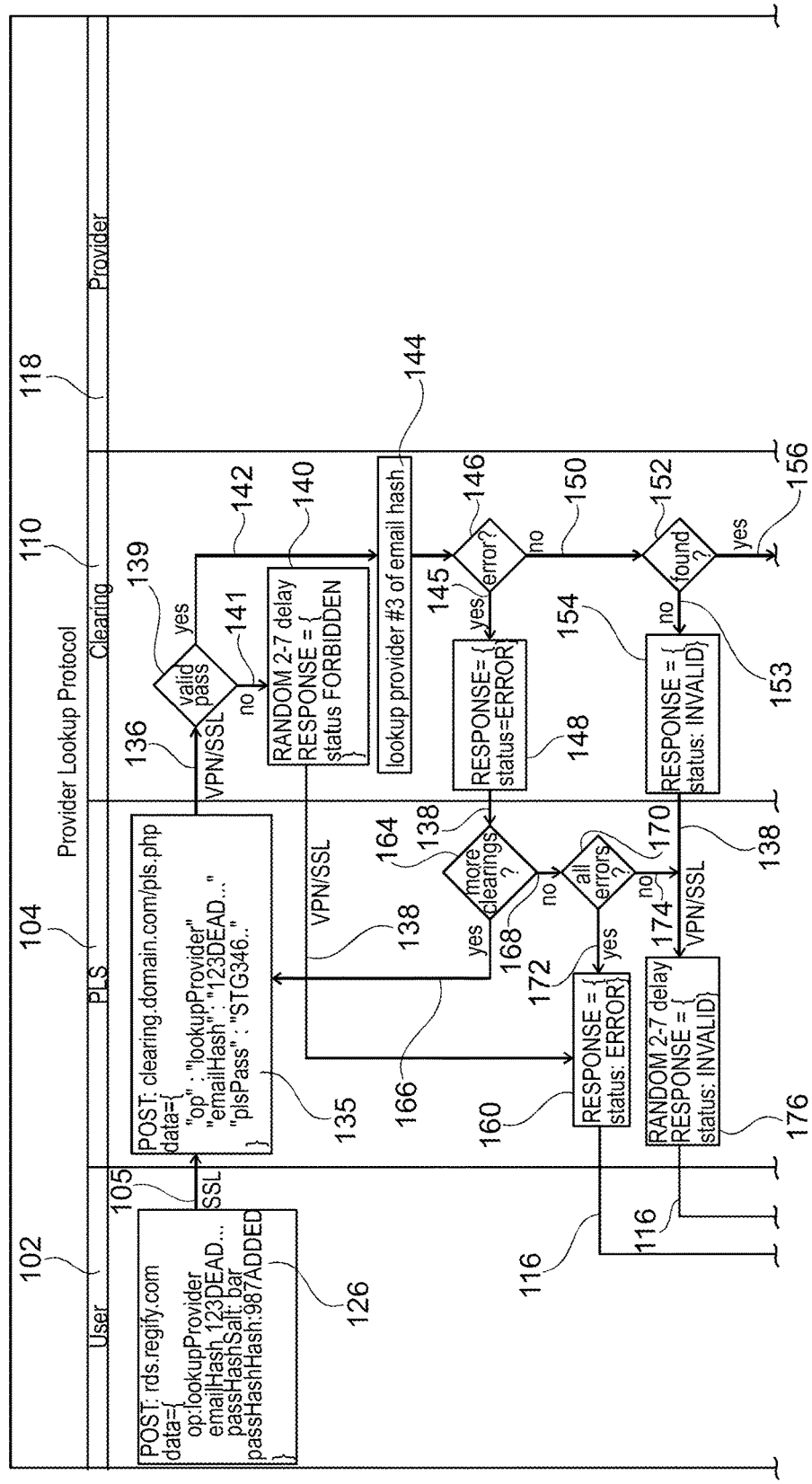
FIG. 2 shows a lookup protocol in accordance with embodiments of the herein disclosed subject-matter.
Figure 2:
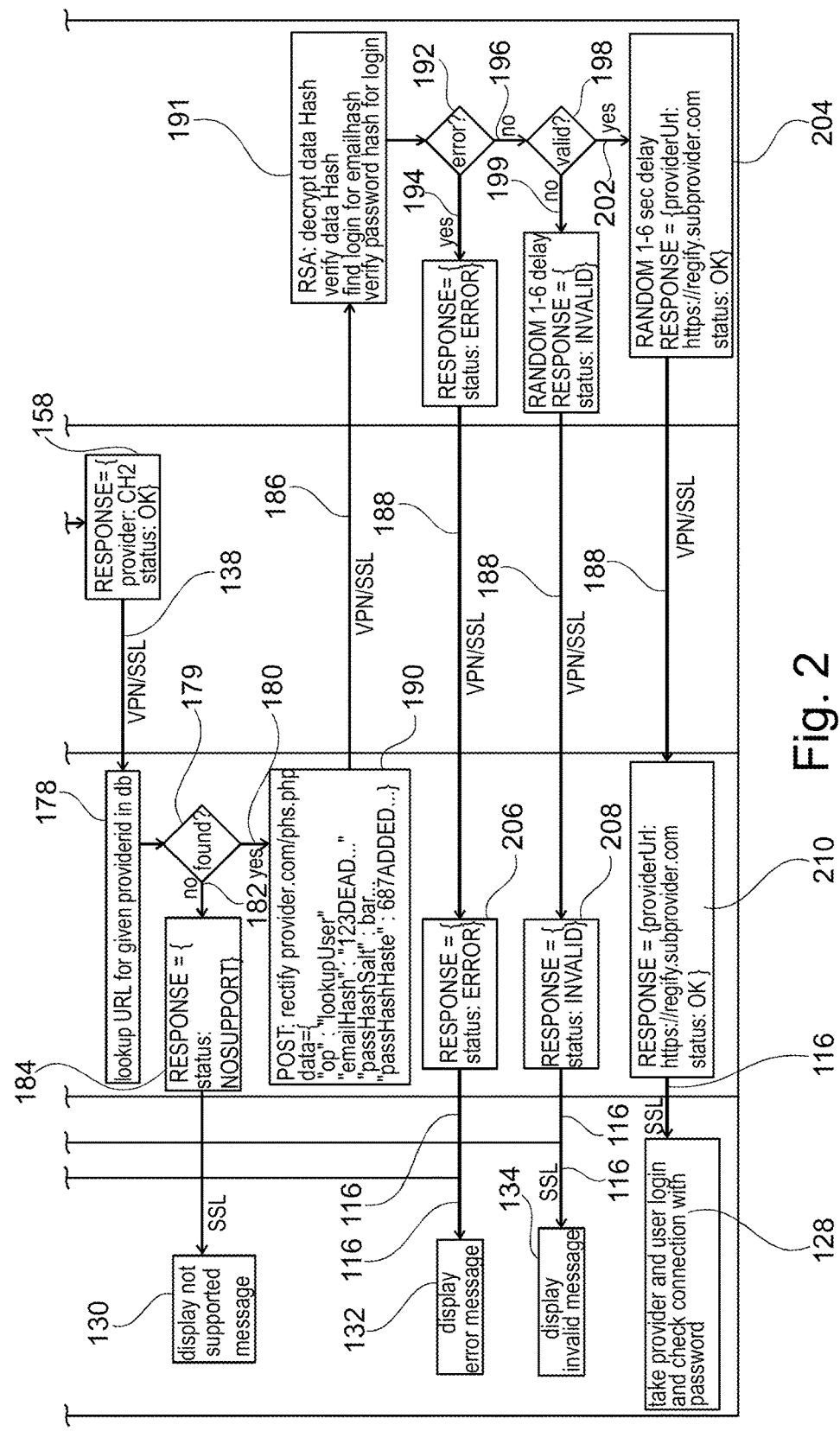

FIG. 2 shows a lookup protocol in accordance with embodiments of the herein disclosed subject-matter.

According to an embodiment, the lookup protocol of FIG. 2 is implemented in a network system according to embodiments of the herein disclosed subject-matter, for example in a network system as described with regard to FIG. 1.

In accordance with embodiments of the herein disclosed subject-matter, the elements of the transmissions between the client unit 102, the lookup unit 104, the clearing unit 110, and the provider unit 118 are defined in JavaScript Object Notation (JSON). According to an embodiment, the units 102, 104, 110, 118 of the network system are communicatively coupled with each other. For example, the communicative coupling between two of the units 102, 104, 110, 118 may be of the type as described with regard to FIG. 2.

An exemplary use case of the network system described herein and in particular as described with regard to FIG. 2 is to provide a user with a client software which needs to communicate with the email provider unit (provider unit 118) of the user. Embodiments of the herein disclosed subject-matter allow in such a case an easy download of an unconfigured client software onto the client unit 102 while the users do not have to remember the specific provider or access details of the provider. In accordance with an embodiment of the herein disclosed subject-matter, the only client-specific data the user has to remember in this embodiment is the email address of the user and the user password required for login of the user at the provider unit. Hence, the client software does not need to download and present a list of providers to the user which then has to select the appropriate provider but rather the user only has to provide the email address and the corresponding user password wherein according to an embodiment the communication with the lookup unit 104 is such that no secret data are exchanged with the lookup unit. In particular, according to an embodiment, the client unit 102 is adapted for generating respective user-related data (e.g. a fingerprint) from the e-mail address and further user-related data (e.g. a salted fingerprint) from the user password. For example, according to an embodiment the client unit 102 is adapted for hashing the email address and hashing a password hash of the user password with a random cryptographic salt. While in the following reference is made to respective fingerprints of the user-specific data (e-mail address) and further user-specific data (user password), it should be understood that these examples are only exemplary and that the following embodiments may also be implemented with any other user-related data and further user-related data.

An overview of the parameters and exemplary embodiments of parameter values involved in the communication between the client unit 102 and the lookup unit 104 according to the exemplary provider lookup protocol illustrated in FIG. 2 is given in table I:

It is noted that according to an embodiment, the return values do not include the login value, contrary to table I.

TABLE I

Parameters of the communication between client unit and lookup unit

| URL | https://pls.regify.com/ |
| parameters | data |
| value | { op: lookupProvider<br>emailHash: 123DEAD...<br>passHashSalt: bar...<br>passHashHash: 987ADDED... } |
| return values | { providerUrl: https://regify.provider.com/<br>login: johnDoe<br>status: OK}<br>or<br>{ status: INVALID }<br>or<br>{ status: ERROR } |
| description | Returns the URL and login to the associate regify provider to the client or status: INVALID in case of invalid credentials. |
| example | POST: https://pls.regify.com/<br>data={<br>op: lookupProvider<br>emailHash: 123DEAD...<br>passHashSalt: bar...<br>passHashHash: 987ADDED...<br>}<br>RESPONSE = {<br>providerUrl: https://portal.regify.com/<br>status: OK<br>} |

The JSON description for an exemplary lookup request 105 from the client unit 102 to the lookup unit 104 is as follows:

TABLE II

JSON description for the parameters of the lookup request 105

| Field Name | Description | Type |
| --- | --- | --- |
| op | Tells the PLS server that we want to find the provider URL and regify login for the given email hash. | String |
| emailHash | The SHA256 hash of the email address that is trying to login. | String |
| passHashSalt | The salt used to hash the password hash with. | String |
| passHashHash | The SHA256 hash of the passHashSalt and the hashed password. | String |

The JSON description for a response transmission 116 from the lookup unit 104 to the client unit 102, which is provided in response to the lookup request, is as follows:

TABLE III

JSON description for the parameters of the response transmission 116

| Field Name | Description | Type |
| --- | --- | --- |
| providerUrl | The URL to the associated provider. | String |
| status | INVALID, ERROR or OK<br>OK - The credentials were valid and providerUrl<br>and login contain their respective data.<br>INVALID - The credentials were invalid and providerUrl and login are not set.<br>ERROR - A system error occurred and providerUrl and login are not set. | String |

Hence, now referring to the lookup protocol in FIG. 2 which implements the lookup request and response transmission as defined in tables I to III, the client unit 102 is communicatively coupled over an SSL connection with the lookup unit 104 and is sending the lookup request 105 as specified in the value section of table I. According to an embodiment, the client unit is adapted for initialisation of the parameters of the lookup request 105. This parameter initialization is represented by box 126. If the email hash and the password hash which are provided to the lookup unit 104 in the lookup request 105 are valid, the lookup unit 104 returns in the response transmission 116 the return values according to the first alternative given in table I, i.e. the provider URL and the login name of the user as well as the status information. According to an embodiment, the client unit takes the provider URL and the login name provides with the response transmission and performs a connection check with the user password known to the client unit, as indicated at 128.

According to an embodiment, with the lookup request 105 the following data are transmitted to the lookup unit 104: an operation to be carried out (OP), wherein the operation may be "look-up provider", corresponding e.g. to a request to find the provider and associated login name for a given e-mail hash. Further, the lookup request 105 may include an email hash of the email address that is trying to log in at the provider unit, a cryptographic salt and a password hash which is calculated from a combination of the hashed user password and the cryptographic salt. As can be taken from table II, the fields in the JSON description may be "OP" for the operation to be carried out, "email hash" for the hash code of the email address of the user, "pass hash salt" for the cryptographic salt and "pass hash hash" for the hash code of the user password, which is a salted hash code of the password hash.

In the response transmission 116, the configuration related data may be provided to the client unit which in the exemplary embodiment are the address of the provider unit (provider URL) and the login name of the user necessary to log in to the provider unit of which the address is included in the response transmission 116. For example, in an embodiment, this provider unit is the provider unit 118. In accordance with a further embodiment, the response transmission 116 further includes status information indicating that the fingerprints provided by the client unit 102 in the lookup request 105 are valid or not. For example, according to an embodiment, the status information in the response transmission is set to one of "invalid", "error" or "ok". Herein, the status information is set to "ok" if the fingerprints provided in the lookup request 105, i.e. the email hash and the password hash are valid. Further, the status information is set to "invalid" if the fingerprints provided in the lookup request 105 are invalid. Further, the status information is "error" if a system error occurred. According to an embodiment, in case the status information is one of "error" and "invalid" the configuration related data is not set in the response transmission 116. According to an further embodiment, the status information may be "no support", indicating that the provider, which associated with the fingerprints provided in the lookup request 105, is not supported by the lookup unit 104.

In accordance with an embodiment, the client unit 102 is adapted for displaying a respective message corresponding to the status information provided in the response transmission 116. For example, if the status information is "no support", the client unit may be adapted to display a message 130 that the provider is not supported by the lookup unit (display "not supported message"). Further, the client unit may be adapted to display a message 132 that an error occurred during the lookup procedure (display "error message"), if the status information indicates that a system error occurred. Further, the client unit 102 may be adapted to display a message 134 that the fingerprints provided in the lookup request 105 are invalid (display "invalid message") if the status information indicates that the fingerprints in the lookup requests are invalid. Further, the client unit 102 may be adapted for display the configuration related data to the user if the status information is "ok", wherein for example the user-specific data is the provider URL and the user login of the user. According to an embodiment, the client unit may be adapted for automatically performing further actions based on the configuration related data received with the response transmission 116 if the status information is "ok". For example, according to an embodiment, the client unit may automatically check the connection with the provider unit 118 by using the provider URL and the user login provided with the response transmission 116 together with the user password entered by the user into the client unit 102. According to an embodiment, the client unit 102 may be adapted for, upon successful check of the connection with the provider unit 118, storing the user-specific data, i.e. the provider URL and the user login as well as the user password. According to other embodiments, only the provider URL and the user login are stored in the client unit and the user is requested to enter his user password before a connection to the provider unit 118 is established by the client unit. It should be noted that according to an embodiment, checking a connection or establishing a connection to the provider unit 118 includes at least a login at the provider unit 118.

In the following, the communication of the lookup unit 104 and the clearing unit 110 according to embodiments of the herein disclosed subject-matter is discussed with regard to FIG. 2.

The communication between the lookup unit 104 and the clearing unit 110 may be performed via an VPN or an SSL connection. Hence, in accordance with a respective embodiment, the lookup unit 104 and the clearing unit 110 are communicatively coupled, e.g. via an VPN or an SSL connection. In particular, the lookup unit 104 and the clearing unit 110 may be communicatively coupled via a VPN or an SSL connection.

According to an embodiment, the lookup unit 104 is adapted for providing a request transmission 136 to the clearing unit 110. According to an embodiment, the request transmission 136 includes a further fingerprint of the user-specific data. In order to properly the fingerprint of user-specific data in the request transmission 136 and the fingerprint of the user-specific data in the lookup request 105, the fingerprint of the user-specific data in the lookup request 105 is called "first fingerprint of the user-specific data" and user-specific data in the request transmission 136 is called "second fingerprint of the user-specific data". However, the terms "first" and "second" shall not be considered as limiting. For example, in accordance with an embodiment the first fingerprint of the user-specific data is identical to the second fingerprint of the user-specific data. In other words, the second fingerprint of the user-specific data may be the fingerprint of the user-specific data provided in the lookup request 105 to the lookup unit.

According to a further embodiment, the request transmission 136 includes a password provided by lookup unit. This password provided by the lookup unit for validating the request transmission is herein also referred to as PLS password. According to an embodiment, the clearing unit is adapted to process the lookup request from the lookup unit only if the PLS password is valid.

According to a further embodiment, the request transmission 136 includes an operation indicator indicating the operation to be performed by the clearing unit. For example, the operation indicator may be "lookup provider" indicating that the clearing unit is requested to retrieve provider information (identification information for the provider) corresponding to the content of the request transmission (e.g. corresponding to the second fingerprint of the user-specific data. According to an embodiment, a response transmission 138 from the clearing unit 110 to the lookup unit 104 includes a status information, indicating the status of the request corresponding to the request transmission 136. According to an embodiment, the response transmission 138 further includes provider identification data identifying the provider unit 118 associated with the further fingerprint of the user-specific data provided to the clearing unit 110 in the request transmission 136.

Having now regard to the processing of the request transmission 136 by the clearing unit 110, according to an embodiment first a check 139 is made whether the PLS password provided in the request transmission is valid. According to an embodiment, the clearing unit is adapted for checking validity of the PLS password. According to an embodiment, the clearing unit 110 is adapted for providing a respective status information in the response transmission 138 from the clearing unit 110 to the lookup unit 104. For example, according to an embodiment, the clearing unit 110 is adapted for setting, at 140, the status information to "forbidden" indicating that further processing of the request transmission 136 is forbidden if the PLS password provided in the request transmission 136 is not valid, indicated at 141. According to an embodiment, the response transmission 138 is not immediately provided after finishing the processing of the request transmission 136 by the clearing unit (e.g. after the password check 139 with result "forbidden"). Rather, after finishing the processing of the request transmission 136 by the clearing unit the response transmission 138 is provided with a predetermined delay (i.e. after a predetermined waiting time) to the lookup unit 104. In this way, the security of the network system may be increased since brute force and timing attacks may be prevented. The predetermined waiting time may be in the range of seconds, e.g. between 1 second and 10 seconds or between 2 seconds and 7 seconds in another embodiment.

According to an embodiment, the clearing unit is adapted to retrieve the provider identification data corresponding to the email hash (e.g. second fingerprint of the user-specific data) received with the request transmission 136 if the password check at 139 yields that the PLS password is valid, indicated at 142. The lookup action, i.e. the retrieval of the provider identification data (provider ID) corresponding to the email hash is indicated at 144 in FIG. 2. If an error occurred during the retrieval of the provider identification data, indicated at 145, for example due to a hardware or software failure at the clearing unit, the status information in the response transmission indicates that an error occurred. According to an embodiment, a determination 146 is made whether or not an error occurred during the retrieval of the provider identification data. If an error occurred, indicated at 145, according to an embodiment the status information is set to "error", as indicated at 148. If no error occurred, indicated at 150, a check is made at 152 whether or not provider identification data was found for the second fingerprint of the user-specific data (e.g. for the given email hash). If no provider identification data was found for the second fingerprint of the user-specific data, indicated at 153, according to an embodiment the status information in the response transmission 138 indicates that no provider identification data is available for the second fingerprint of the user-specific data provided in the request transmission 136 (status information: "invalid"). For example, according to an embodiment, the clearing unit is adapted for setting the status information to "invalid", indicated at 154, if no provider identification data is found for the given email hash.

According to an embodiment, the clearing unit 110 is adapted to provide status information indicating that provider identification data have been found for the second fingerprint of the user-specific data (email hash), e.g. by setting the status information to "ok", if provider identification data have been found for the second fingerprint of the user-specific data, indicated at 156. According to an embodiment, only in this case the provider identification data is set in the response transmission 138. In the exemplary example in FIG. 2, the provider identification data is "CH2". The setting of the provider identification data and the setting of the status information in the response transmission 138 is indicated at 158 in FIG. 2.

According to an embodiment, the request transmission 136 as well as the corresponding response transmission 138 are implemented by using a JSON description for the parameters of the request transmission and the response transmission. Table IV shows the JSON description for the parameters of the request transmission 136:

TABLE IV

| \multicolumn{3}{c}{JSON description for the parameters of the request transmission 136} | | |
| --- | --- | --- |
| Field Name | Description | Type |
| op | Tells the clearing that we want to find the provider id for the given email hash. | String |
| emailHash | The SHA256 hash of the email address that were trying to find the provider for. | String |
| plsPass | The PLS password at the given clearing. | String |

The JSON description for a corresponding exemplary response transmission 138 are provided in table V:

TABLE V

| \multicolumn{3}{c}{JSON description for the parameters of the response transmission 138} | | |
| --- | --- | --- |
| Field Name | Description | Type |
| providerId | The id of the associated provider. Usually country code + id. Example: DE1, CH3, LU1 | String |

TABLE V-continued

| \multicolumn{3}{c}{JSON description for the parameters of the response transmission 138} | | |
| --- | --- | --- |
| Field Name | Description | Type |
| status | INVALID, ERROR or OK<br>OK - The email hash was found and providerId contains the associated provider id.<br>INVALID - The email hash was not found and providerId is not set.<br>ERROR - A system error occurred and providerId is not set.<br>FORBIDDEN - The provided plsPass value was invalid | String |

An overview of the parameters and exemplary embodiments of parameter values involved in the communication between the lookup unit 104 and the clearing unit 110 according to the exemplary provider lookup protocol illustrated in FIG. 2 is given in table VI:

TABLE VI

| \multicolumn{2}{c}{Parameters of the communication between lookup unit and the clearing unit} | |
| --- | --- |
| URL | http://195.211.14.250/pls.php |
| parameters | data |
| value | { op: lookupProvider<br>    emailHash: 123DEAD...<br>    plsPass: sjwnfw...} |
| return values | { providerId DE2<br>    status: OK }<br>or<br>{ status: INVALID }<br>or<br>{ status: ERROR }<br>or<br>{ status: FORBIDDEN } |
| description | Returns OK and the provider id associated with the given email hash. INVALID in case the hash was not found, or ERROR if there was a system error. FORBIDDEN means the plsPass value was wrong. The PLS server will abort respond with status: ERROR. |
| example | POST: http://195.211.14.250/pls.php<br>data={<br>    op: lookupProvider<br>    emailHash: 123DEAD...<br>    plsPass: sjwnfw...<br>}<br>RESPONSE = {<br>    providerId: DE2<br>    status: OK<br>} |

In the following, the further processing of the response transmission 138 provided by the clearing unit 110 to the lookup unit 104 is described by reference to embodiments of the herein disclosed subject-matter.

If the response transmission 138 includes status information indicating that the PLS password of the request transmission 136 was not valid, the status information in the response transmission 116 from the lookup unit 104 to the client unit 102 indicates that an error occurred during processing of the lookup request 105. For example, according to an embodiment, the lookup unit is adapted for setting the status information in the response transmission 116 to "error", indicated at 160 in FIG. 2, if the response transmission 138 includes status information indicating that the PLS password of the request transmission 136 was not valid.

If the response transmission 138 from the clearing unit 110 to the lookup unit 104 indicates that an error occurred during the lookup of the provider ID at 144 (status: "error"), the lookup unit may be adapted for checking, indicated at 164, whether further clearing operations have to be performed. For example, according to an embodiment, two or more clearing units (e.g. for Europe, Asia, Near East) are provided and in this case the lookup unit may be configured to continue, if one clearing unit fails, by repeating the operations with the next clearing unit. For example, if the check 164 for further cleaning operations indicates that further clearing operations have to be performed, indicated at 166, according to an embodiment the lookup unit 104 is adapted to initialize, at 135, the parameters for the request transmission 136 with the values for the further clearing operation. If the check 164 for further clearing operations indicates that no further clearing operations are to be performed, indicated at 168, a check 170 is performed whether or not all clearing operations failed. If this check 170 yields that all clearing operations failed, indicated at 172, the status information in the response transmission 116 from the lookup unit 104 to the client unit 102 may be set by lookup unit to "error", indicated at 160. If the check 170 yields that not all clearing operations failed, indicated at 174, the status information in the response transmission 116 from the lookup unit 104 to the client unit 102 may be set by lookup unit to "invalid", indicated at 176.

If the status information in the response transmission 138 from the clearing unit 110 to the lookup unit 104 indicates that no provider identification data was found for the further fingerprint of the user-specific data (status: "invalid"), the lookup unit 104 is adapted for providing in the response transmission 116 the status information that the user-specific data (email address) and/or the further user-specific data (user password) is invalid. For example, according to an embodiment, the lookup unit 104 is adapted for setting the status information in the response transmission 116 to "invalid", indicated at 176.

If the response transmission 138 from the clearing unit 110 to the lookup unit 104 includes a status information indicating that provider identification data have been successfully retrieved for the further fingerprint of the user-specific data, and/or if the response transmission 138 includes a provider identification data, the lookup unit 104 may be adapted for retrieving the configuration related data associated with the user-specific data (e.g. associated with the password hash received by the lookup unit 104 with the lookup request 105. For retrieving the configuration related data, according to an embodiment the lookup unit 104 is adapted for retrieving provider-related data (e.g. a provider address such as a provider URL) associated with the provider identification data received from the clearing unit with the response transmission 138.

According to an embodiment, the provider identification data may be set to null or another predetermined value if the provider identification data corresponding to the second fingerprint of the user-specific data (e-mail hash) is not successfully retrieved. In such a case, a separate status information may be omitted in the response transmission 138 since the provider identification data itself provide some information about the status of the retrieval of the provider identification data.

If the retrieval 178 of the provider-related data which correspond to the provider identification data is successful, indicated at 180, i.e. provider-related data have been found, a check 179 for successful retrieval of the provider-related data is positive. The lookup unit 104 may be adapted for providing to the client unit 102 in the response transmission 116 the status information that the provider of the client unit 102 which is associated with the user-specific data is not supported by the lookup unit 104, if the check 179 for successful retrieval of the provider-related data is negative, indicated at 182. For example, according to an embodiment, the lookup unit 104 may be adapted to set the status information to "no support", indicated at 184, in such a case.

According to an embodiment the lookup unit 104 is adapted for transmitting a provider request 186 to the provider unit 118 which is identified by the provider identification data, if the retrieval of the provider-related data (the provider URL in the exemplary case illustrated in FIG. 2) was successful, indicated at 180. According to an embodiment, the lookup unit 104 is adapted for transmitting the provider request 186 to the provider unit 118 by using the provider-related data (e.g. by using the provider URL).

According to an embodiment, the provider unit 118 is adapted for processing the provider request 186, for example, for performing at least one of (i) a validity check of the user-specific data (email address) and/or the further user-specific data (user password); and (ii) a retrieval of configuration related data. According to an embodiment, the provider unit 118 is adapted for providing a provider response 188 to the lookup unit 104 in response to the processing of the provider request 186. For communication between the lookup unit 104 and the provider unit 118, the lookup unit 104 and the provider unit 118 may be communicatively coupled, for example via a VPN or an SSL connection. According to an embodiment, the provider unit 118 only performs a check of the validity of the user-related data known to the lookup unit 104 (e.g. the fingerprint of the user-specific data and the fingerprint of the further user-specific data). According to another embodiment, the provider unit 118 may alternatively or additionally be adapted for retrieving configuration related data upon receiving the provider request 186 and providing the configuration related data, e.g. login data, in the provider response 188 to the lookup unit 104. According to an embodiment, the provider request 186 includes user-related data and further user related data as described herein, e.g. the fingerprint of the user-specific data (hash code of the email address), the fingerprint of the further user-specific data (salted hash of the password hash), and the cryptographic salt used for generating the fingerprint of the further user-specific data. Further, the provider request may include an operation instruction to the provider unit, for example instructing the provider unit to lookup for further user-related data. According to an embodiment, respective parameters of the provider request 186 may be initialized, indicated at 190, with the values available to the lookup unit 104. A JSON description for the data parameters for posting the provider request is given in table VII.

TABLE VII

JSON description for the parameters of the provider request 186

| Field Name | Description | Type |
| --- | --- | --- |
| op | Tells the provider that we want to verify an email address and retrieve the associated regify user name. | String |
| emailHash | The SHA256 hash of the email address that is trying to login. | String |
| passHashSalt | The salt used to hash the password hash with. | String |
| passHashHash | The SHA256 hash of the passHashSalt and the hashed password. | String |

According to an embodiment, the provider unit 118 is adapted for, upon receiving the provider request 186, verifying the user-related data provided by the lookup unit 104. For example, according to an embodiment, the provider unit 118 is adapted for verifying the fingerprint of the user-specific data and the fingerprint of the further user-specific data. To this end, the provider unit may calculate the fingerprint of the user-specific data stored at the provider unit 118 and the fingerprint of the further user-specific data stored at the provider unit 118. If one of the fingerprints, for example the fingerprint of the further user-specific data, is a salted fingerprint, the provider unit 118 is adapted to use the cryptographic salt provided with the provider request 186 to calculate the salted fingerprint. According to an embodiment, the provider unit 118 is adapted for verifying validity of the user-specific data (e.g. verifying the e-mail hash) by calculating the fingerprint of the user-specific data and comparing the result to the fingerprint of the user-specific data received with the provider request 186. According to an embodiment, the provider unit 118 is adapted for finding further user-related data, for example a login name corresponding to the user-specific data. Further, according to an embodiment, a provider unit 118 is adapted for verifying the password fingerprint by retrieving the user password for the login name and calculating the fingerprint for the retrieved user password and comparing the resulting fingerprint to the fingerprint of the user password received with the provider request 186. The above described embodiments of the processing of the provider request 186 by the provider unit is indicated at 191 in FIG. 2. It is noted that according to an embodiment, where the provider request 186 is transmitted to the provider unit 118 over a secured connection (e.g. VPN or SSL connection), the provider unit is adapted for decrypting the received encrypted provider request 186 to make the provider request available to the provider unit.

According to an embodiment, the provider unit 118 is adapted for performing a check 192 whether an error has occurred during retrieval of the login name. According to an embodiment, a provider unit 118 is adapted for including a status information into the provider response 188, the status information indicating that a system error occurred if the check 192 yields that an error occurred, indicated at 194 in FIG. 2. Further, according to an embodiment the provider unit 118 is adapted for not setting the login name in the provider response 188 in such a case.

According to an embodiment, the provider unit 118 is adapted for performing a check 198 whether the user-related data provided with the provider request are valid user-related data. For example, according to an embodiment, the provider unit 118 checks at 198 whether the user-specific data corresponding to the fingerprint of the user-specific data and the further user-specific data corresponding to the fingerprint of the further user-specific data are valid. According to an embodiment, the check 198 is performed if no error occurred in the error check 192, indicated at 196. If the validity check 198 is negative, indicated at 199 in FIG. 2, e.g. in case that the user-specific data and/or the further user-specific data are not valid, according to an embodiment, the provider unit 118 provides in the provider response 188 a status information to the lookup unit 104, the status information indicating that the user-specific data and/or the further user-specific data are not valid. For example, according to an embodiment, the provider unit 118 is adapted for setting the status information to "invalid", as indicated at 200.

The provider unit 118 may be adapted for including a status information in the provider response, the status information indicating that the user-related data on which the fingerprint(s) are based, are valid, if the validity check 198 is positive as indicated at 202. Further, according to an embodiment, the provider unit 118 is adapted for including further configuration related data in the provider response 188 if the validity check 198 is positive.

Initializing of the respective parameters of the provider response 188 is indicated at 204 and the corresponding JSON response description is given in table VIII.

TABLE VIII

JSON description for the parameters of the provider response 188

| Field Name | Description | Type |
| --- | --- | --- |
| providerUrl | The actual URL of the associated sub provider. May be different from the main provider running the PLS service. | String |
| status | INVALID, ERROR or OK<br>OK - The credentials were valid and login contains its respective data.<br>INVALID - The credentials were invalid and login is not set.<br>ERROR - A system error occurred and login is not set. | String |

An overview of the parameters and exemplary embodiments of parameter values involved in the communication between the lookup unit 104 and the provider unit 118 is given in table IX.

TABLE IX

Parameters of the communication between lookup unit and the provider unit

| URL | https://regify.provider.com/pls.php |
| --- | --- |
| parameters | data |
| value | { op: lookupUser<br>    emailHash: 123DEAD...<br>    passHashSalt: bar...<br>    passHashHash: 987ADDED... } |
| return values | { login: johnDoe<br>    status: OK }<br>or<br>{ status: INVALID }<br>or<br>{ status: ERROR } |
| description | Returns the login associated with the given email address regify provider to the client or status: INVALID in case of invalid credentials. |
| example | POST: https://regify.provider.com/pls.php<br>data={<br>    op: lookupUser<br>    emailHash: 123DEAD...<br>    passHashSalt: bar...<br>    passHashHash: 987ADDED...<br>}<br>RESPONSE = {<br>    providerUrl: https://regify.subprovider.com/<br>    status: OK<br>} |

According to an embodiment, the lookup unit 104 is adapted for providing the response transmission 116 from the lookup unit 104 to the client unit 102 in response to the provider response 188 received by the client unit 104 from the provider unit 118. For example, if the status information in the provider response 188 indicates that a system error occurred, a respective status information, indicating that an error had occurred, is included in the response transmission 116 from the lookup unit 104 to the client unit 102. For example, the lookup unit 104 may be adapted to set the status information in the response transmission 116 to "error" as indicated at 206 in FIG. 2. Further, if the provider response 188 from the provider unit 118 indicates that the user-related data corresponding to the fingerprint(s) provided with the lookup request 105 to the lookup unit 104 is not valid, the lookup unit may include a respective status information in the response transmission 116 from the lookup unit 104 to the client unit 102. For example, according to an embodiment, the lookup unit may be adapted for setting the status information in such a case to "invalid", as indicated at 208.

According to an embodiment, the lookup unit 104 is adapted for providing the provider-related data retrieved by the lookup unit 104 at the lookup procedure 178 to the client unit 102 with the response transmission 116. According to an embodiment, the lookup unit 104 is adapted for providing the provider-related data only if the status information of the provider response 188 indicates that the user-related data corresponding to the fingerprint(s) provided with the lookup request 105 to the lookup unit 104 are valid.

According to an embodiment, the lookup unit 104 is adapted to include the configuration related data, received from the provider unit 118 with the provider response 188, in the response transmission 116 from the lookup unit 104 to the client unit 102 if such configuration related data is provided by the provider unit 118 with the provider response 188. Initialization of the respective parameters of the response transmission 116 is indicated at 210 in FIG. 2.

Figure 3:
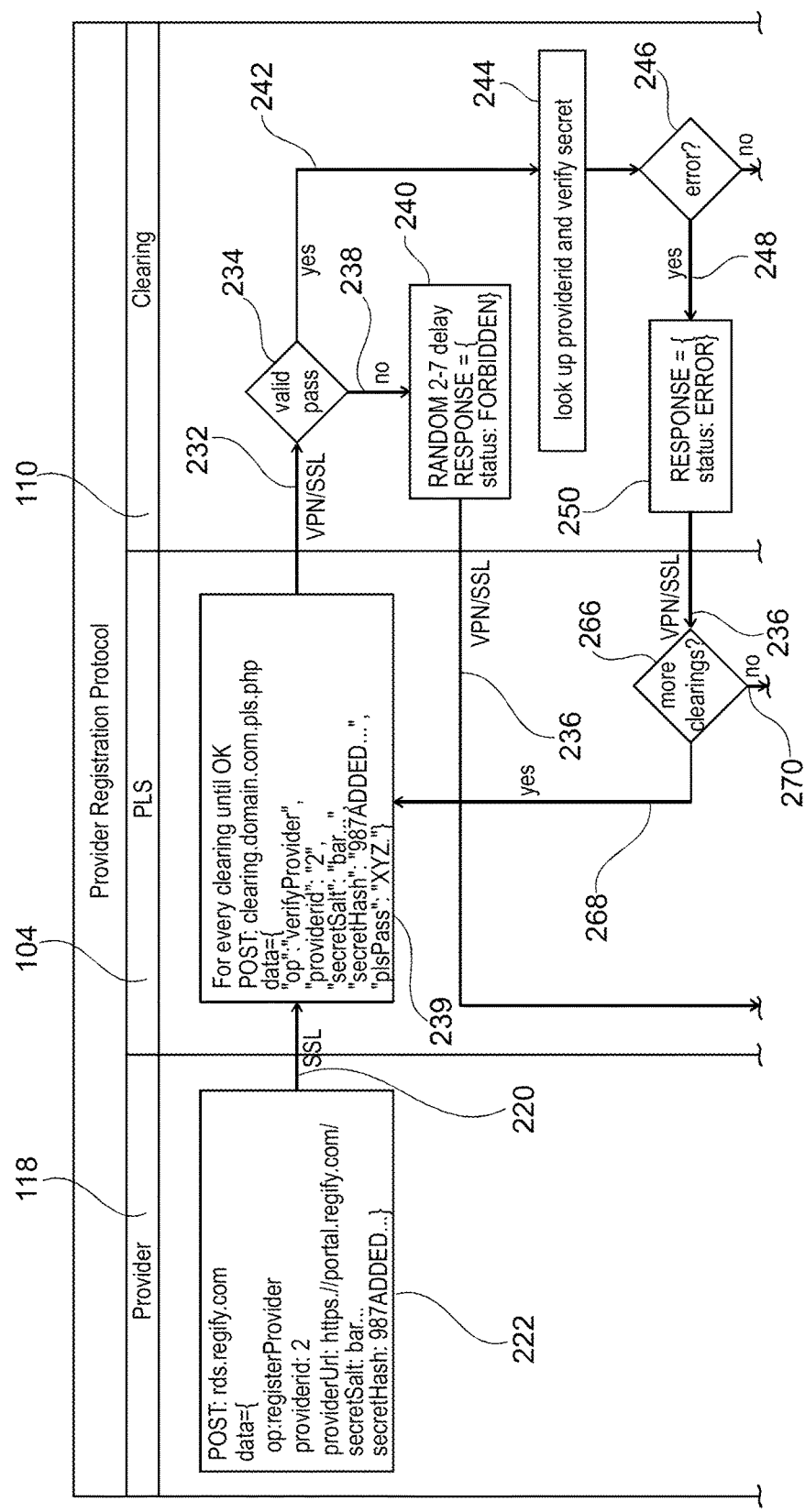
FIG. 3 schematically shows the operation of a network system according to embodiments of the herein disclosed subject-matter.
Figure 3:
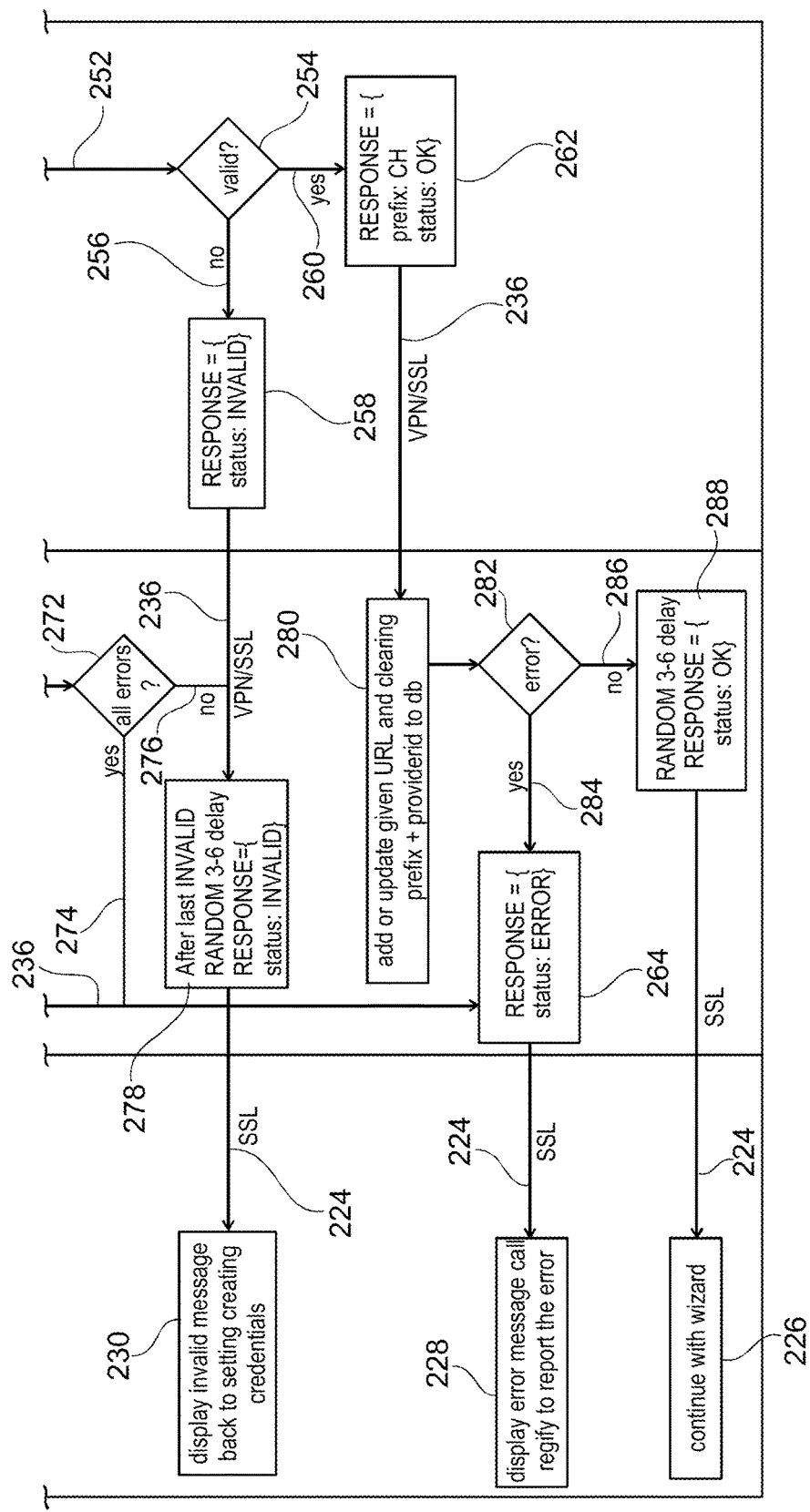

FIG. 3 schematically shows the operation of a network system according to embodiments of the herein disclosed subject-matter.

FIG. 3 relates to the registration of a provider unit 118 at the lookup unit 104 and the clearing unit 110. In particular, FIG. 3 relates to a provider registration protocol in which the provider unit 118 is registered at the clearing unit 110 and the lookup unit 104. Regarding the operation of the network system, it should be understood that each provider unit which is involved in communications as described with regard to FIG. 2 must be registered at the clearing unit 110 and the lookup unit 104.

According to an embodiment, the provider unit 118 is adapted for providing a registration request 220 to the lookup unit 104. According to an embodiment, the registration request 220 includes at least part of the provider identification data which identify the provider unit 118. For example, according to an embodiment, the provider identification data includes a prefix and a provider ID. In accordance with an embodiment, only part of the provider identification data, e.g. the provider ID in the exemplary case, is provided to the lookup unit 104 with the registration request 220. The provider ID is referred to as "providerid" in FIG. 3. According to an embodiment, the registration request 220 includes an operation to be carried out (OP). For example, the operation to be carried out may be "to register the new provider unit with the lookup unit 104". According to an embodiment, lookup unit is adapted for registering the part of the provider identification data (the provider ID) and the network address of the provider unit 118, e.g. in a database controlled by the lookup unit. According to a further embodiment, the registration request 220 includes verification-related data based on verification data, e.g. a fingerprint of the verification data which is referred to as "secretHash" in FIG. 3. The verification-related data may be used by the lookup unit 104 and/or the clearing unit 110 for verifying whether or not the registration request 220 has been transmitted by the provider unit 118 corresponding to the provider ID given in the registration request 220. In other words, according to an embodiment, the verification data is secret data and is exclusively known to the involved units, e.g. the provider unit and the clearing unit in the exemplary case shown in FIG. 3. According to a further embodiment, the fingerprint of the verification data may be used to complement the part of the provider identification data (provider ID) provided to the lookup unit 104 with the registration request 220. The complement which together with the part of the provider identification data forms the complete provider identification data may be provided by the clearing unit.

According to a further embodiment, the registration request 220 may include a cryptographic salt (e.g. referred to as "secret salt" in FIG. 3), for example in a case where the fingerprint of the verification data is a salted fingerprint of the verification data generated by using the cryptographic salt has been used for generating the fingerprint of the verification data. According to an embodiment, the registration request 220 further includes the network address of the provider unit 118, e.g. the URL of the provider unit 118.

The JSON description for the data parameters when posting the registration request 220 from the provider unit 118 to the lookup unit 104 is shown in table X.

TABLE X

JSON description for the parameters of the registration request 220

| Field Name | Description | Type |
| --- | --- | --- |
| op | Tells the PLS server that we want to register the new provider id and URL with the PLS server. | String |
| providerId | The provider id that the clearing server has allocated for this provider. | Integer |
| providerUrl | The URL under which users can log into the portal. | String |
| secretSalt | The salt used to hash the clearing secret with. | String |
| secretHash | The SHA256 hash of the secretSalt and the secret. | String |

Initialization of the parameters of the registration request 220 by the provider unit 118 is indicated at 222 in FIG. 3.

According to an embodiment, the provider unit 118 is further adapted for receiving a response transmission 224 from the lookup unit 104 in response to the registration request 220. According to an embodiment, the response transmission 224 includes status information, e.g. regarding the successful processing of the registration request. For example, if the status information indicates that the registration of the provider unit has been successfully performed (e.g. if the status has been set to "ok"), the provider unit may be adapted for continuing the execution of a method which has initiated the registration request 220 indicated at 226. Such a method may be for example a registration wizard running on the provider unit 118.

According to a further embodiment, the provider unit 118 is adapted for displaying an error message, 228, if the status information in the response transmission 224 indicates that an error has occurred (status: error). For example, the error message may indicate to the user to call an operator of the lookup unit to report the error.

According to an embodiment, the provider unit is adapted for displaying an invalid message, if the status information in the response transmission 224 indicates that a security check during processing of the registration request 220 has failed, 230.

A JSON description of the parameters of the response transmission 224 according to an embodiment is shown in table XI.

TABLE XI

JSON description for the parameters
of the response transmission 224

| Field Name | Description | Type |
|---|---|---|
| status | INVALID, ERROR or OK<br>OK - The credentials were valid.<br>INVALID - The credentials were invalid.<br>ERROR - A system error occurred. | String |

An overview of the parameters involved in the registration request 220 and the response transmission 224, i.e. the parameters involved in the communication between the provider unit and the lookup unit during provider registration is given in table XII.

TABLE XII

Parameters of communication between provider and lookup unit

| | |
|---|---|
| URL | https://pls.regify.com/ |
| parameters | data |
| value | { op: registerProvider<br>    providerId: 2<br>    providerUrl: https://portal.regify.com/<br>    secretSalt: bar...<br>    secretHash: 987ADDED... } |
| return<br>values | { status: OK }<br>or<br>{ status: INVALID }<br>or<br>{ status: ERROR } |
| description | Returns OK if the registration succeeded and INVALID in case of invalid credentials. ERROR if there was a system error. |
| example | POST: https://rds.regify.com/<br>data={<br>    op: registerProvider<br>    providerId: 2<br>    providerUrl: https://portal.regify.com/<br>    secretSalt: bar...<br>    secretHash: 987ADDED...<br>}<br>RESPONSE = {<br>    status: OK<br>} |

According to an embodiment, the lookup unit 104 is adapted for receiving the registration request 220 from the provider unit 118. According to an embodiment, the lookup unit 104 is adapted for transmitting a request transmission 232 to the clearing unit, the request transmission 232 including provider-related identification data which is based on the at least part of the provider identification data which the lookup unit received with the registration request 220. The initialization of the parameters of the request transmission 232 is indicated at 233 in FIG. 3. According to an embodiment, the provider-related identification data is identical to the at least part of the provider identification data of the registration request 220 which according to an embodiment is the provider ID, referred to as "providerid" in the initialization 233 in FIG. 3. According to a further embodiment, the request transmission 232 includes a password "plsPass", herein also referred to as PLS password. According to an embodiment, the PLS password in the request transmission 232 is necessary for processing of the request transmission by the clearing unit. In other words, according to an embodiment, the clearing unit is adapted for not processing the request transmission 232 if no valid PLS password is included in the request transmission 232. According to an embodiment, the request transmission 232 includes the verification-related data which the lookup unit 104 received from the provider unit 118 with the registration request 220. It should be understood that if the verification-related data is a salted fingerprint of the verification data, the request transmission 232 also includes the cryptographic salt that has been used for calculating the salted fingerprint of the verification data. As mentioned above, the cryptographic salt may be provided to the lookup unit 104 by the provider unit 118 in the registration request 220.

According to a further embodiment, the request transmission 232 further includes an operation parameter "op" indicating the operation to be performed by the clearing unit with the request transmission 232. For example, according to an embodiment, the operation parameter may request the verification of the at least part of the provider identification data and/or the verification-related data. For example, according to an embodiment, the operation parameter may be set to "verify provider" by the lookup unit 104.

According to an embodiment, the clearing unit 110 is adapted for providing a response transmission 236 to the lookup unit 104 in response to the request transmission 232.

According to an embodiment, the clearing unit 110 is adapted for checking the validity of the PLS password provided with the request transmission 232, as indicated at 234. The clearing unit 110 may be adapted to include a status information into the response transmission 236, the status information indicating that the processing of the request transmission 232 by the clearing unit 110 is forbidden if the PLS password provided to the clearing unit with the request transmission 232 is not valid, indicated at 238. In accordance with such an embodiment the clearing unit 110 may be adapted for setting the status information ("status") in the response transmission 236 to "forbidden" if the password check 234 is negative, i.e. the PLS password provided with the request transmission 232 is not valid. Setting the status information to "forbidden" is indicated at 240 in FIG. 3. According to a further embodiment not shown in FIG. 3, the status information in the response transmission 236 may indicate that the PLS password was not valid.

If the validity check of the PLS password at 234 yields the result that the PLS password is valid, indicated at 242, the clearing unit is in accordance with an embodiment adapted to look up the provider identification data ("providerid"), e.g. to look up the complement of the part of the provider identification data, and/or verify the verification data ("secret"), indicated at 244, e.g. by verifying whether the verification-related data (e.g. the fingerprint of the verification data) is valid. For look up of the provider identification data, according to an embodiment the clearing unit may has stored in a storage device thereof the complete provider identification data.

According to an embodiment, an error check 246 is performed, the error check 246 indicating whether or not an error occurred during look up of the provider ID and/or during verifying the fingerprint of the verification data. For example, the clearing unit 110 may be adapted for including status information into the response transmission 236, the status information indicating that an error occurred during processing of the request transmission, if a system error occurred, indicated at 248. For example, according to an embodiment, the clearing unit 110 is adapted for setting, indicated at 250, the status in the response transmission 236 to "error" if the error check 246 indicates that an error occurred.

If no error occurred, indicated at 252, a determination is made whether the verification of the verification data, e.g. the fingerprint of the verification data is valid. This validity check is indicated at 254. According to an embodiment, the clearing unit 110 is adapted for including into the response transmission 236 status information indicating that the verification data or the fingerprint of the verification data is not valid if the validity check 254 indicates that the verification data (or the fingerprint of the verification data) is not valid, indicated at 256. In this regard, it should be noted that determining the validity of the fingerprint of the verification data is considered to be identical to determining the validity of the verification data. According to an embodiment, the validity is determined by calculating a respective fingerprint from the verification data stored at the clearing unit and comparing the thus obtained fingerprint to the fingerprint of verification data received with the request transmission 232. If both fingerprints match, the verification data is valid and so is the fingerprint of the verification data.

If the validity check 254 yields the result that the fingerprint of the verification data is not valid, indicated at 256, the clearing unit may be adapted for setting the status in the response transmission 236 to "invalid", indicating that the provider identification data or at least the part thereof, provided with the request transmission to the clearing unit 110, and/or the verification-related data is not valid, as indicated at 258 in FIG. 3. According to an embodiment, the clearing unit is adapted for including the complement of the provider identification data into the response transmission 236 if the validity check at 254 indicates that the provider identification data and/or the verification-related data is valid, indicated at 260. According to a further embodiment, the clearing unit 110 may be further adapted for providing status information into the response transmission 236, the status information indicating that the request transmission 232 has been successfully processed by the clearing unit 110 (status: ok).

According to an embodiment, the lookup unit 104 is adapted for receiving the response transmission 236 from the clearing unit 110. According to an embodiment, the lookup unit 104 is adapted for setting the status information in the response transmission 224 from the lookup unit 104 to the provider unit 118 to a value which indicates that an error occurred ("status: error", indicated at 264), if the response transmission 236 from the clearing unit 110 to the lookup unit 104 indicates that the PLS password provided in the request transmission 232 is not valid (status: "forbidden").

According to an embodiment, the lookup unit 104 is adapted to check for more clearings, indicated at 266, i.e. to check whether further registration requests are to be processed by the lookup unit 104, if the status information in the response transmission 236 indicates that a system error occurred at the clearing unit 110. If the check for more clearings 266 yields that at least one further registration request is to be processed by the lookup unit 104, the lookup unit 104 is adapted to process the at least one further registration request, indicated at 268. If no further registration request is to be processed by the lookup unit 104, indicated at 270, a determination is made, indicated at 272, whether all registration requests yielded errors. If the answer is yes, indicated at 274, the status information in the response transmission 224 from the lookup unit 104 to the provider unit 118 is set by the lookup unit 104, indicated at 264, so as to indicate that an error occurred ("status: error").

If the determination whether all registration requests resulted in an error, 272, yields the result that this is not the case, indicated at 276, the status information in the response transmission 224 provided by the lookup unit 104 to the provider unit 118 is set to "invalid".

According to an embodiment the lookup unit 104 is adapted for setting the status information in the response transmission 224 from the lookup unit 104 to the provider unit 118 so as to indicate that at least one of the at least part of the provider identification data and the verification-related data is invalid ("status: invalid", indicated at 278), if the response transmission 236 from the clearing unit 110 to the lookup unit 104 indicates that at least one of the at least part of the provider identification data and the verification-related data is invalid.

According to an embodiment, the lookup unit 104 is adapted for adding the network address of the provider unit 118 (provided to the lookup unit 104 with the registration request 220) and the (associated) provider identification data to a storage device of the lookup unit 104, for example to a database of the lookup unit 104. According to a further embodiment, the lookup unit 104 is adapted for updating the network address of the provider unit 118 and the associated provider identification data in the storage device of the lookup unit 104. According to an embodiment, where only part of the provider identification data is provided to the lookup unit 104 with the registration request 220, the lookup unit 104 is adapted for combining the complement of the provider identification data and the part of the provider identification data received with the registration request 220 into the full provider identification data. According to an embodiment, the complement of the provider identification data is a prefix and the part of the provider identification data provided with the registration request 220 is a provider ID, as exemplarily shown in FIG. 3. The adding or updating of the provider network address and the associated provider identification data to the storage device (not shown in FIG. 3) is indicated at 280 and is hereinafter referred to as registration.

According to an embodiment, determination 282 is made as to whether an error occurred during the registration 280. If an error occurred during the registration 280, indicated at 284, the status information in the response transmission 224 from the lookup unit 104 to the provider unit 118 is set so as to indicate that an error occurred during the registration of the provider unit ("status: error", indicated at 264).

According to an embodiment, the lookup unit 104 is adapted for setting the status information in the response transmission 224 so as to indicate that the registration of the provider unit 118 at the lookup unit 104 (and the clearing unit 110) has been successful ("status: ok", indicated at 288) if no error occurred during the registration 280 at the lookup unit 104, indicated at 286.

According to an embodiment, the request transmission 232 as well as the response transmission 236 are implemented by using a JSON description for the parameters of the request transmission and the response transmission. Table XIV shows the JSON description for the parameters of the request transmission 232:

TABLE XIII

JSON description for the parameters of the request transmission 232

| Field Name | Description | Type |
|---|---|---|
| op | Tells the clearing that we want to verify the provider with the given id. | String |
| providerId | The provider id to append to the clearing server's provider prefix. | Integer |
| secretSalt | The salt used to hash the clearing secret with. | String |
| secretHash | The SHA256 hash of the secretSalt and the secret. | String |
| plsPass | The PLS password at the given clearing. | String |

The JSON description for an exemplary response transmission 236 is provided in table XIV:

TABLE XIV

JSON description for the parameters
of the response transmission 236

| Field Name | Description | Type |
|---|---|---|
| prefix | The prefix of the clearing server associated with the given provider id. Usually country code. Example: DE, CH, LU | String |
| status | INVALID, ERROR or OK<br>OK - The provider id was found and the secret valid. prefix contains the prefix associated with the responding clearing server.<br>INVALID - The provider id and secret were invalid or not found, prefix is not set.<br>ERROR - A system error occurred and prefix is not set. | String |

An overview of the parameters and exemplary embodiments of parameter values involved in the communication between the lookup unit 104 and the clearing unit 110 according to the exemplary provider registration protocol illustrated in FIG. 3 is given in table XV:

TABLE XV

Parameters of the communication between
provider unit and the lookup unit

| | |
|---|---|
| URL | http://195.211.14.250/pls.php |
| parameters | data |
| value | { op: verifyProvider<br>   providerId: 2<br>   secretSalt: bar...<br>   secretHash: 987ADDED...<br>   plsPass: lks54..} |
| return values | { prefix: CH<br>  status: OK }<br>or<br>{ status: INVALID }<br>or<br>{ status: ERROR }<br>or<br>{ status: FORBIDDEN } |
| description | Returns OK and the provider id prefix. INVALID in case the hash was not found, or ERROR if there was a system error. FORBIDDEN means the plsPass value was wrong. The PLS server will abort respond with status: ERROR.<br>POST: http://195.211.14.250/pls.php<br>data={<br>  op: verifyProvider<br>  providerId: 2<br>  secretSalt: bar...<br>  secretHash: 987ADDED...<br>  plsPass: lks54..<br>}<br>RESPONSE = {<br>  prefix: CH<br>  status: OK<br>} |

From the embodiments disclosed herein, a person skilled in the art easily recognizes that the embodiments can be implemented in various ways by taking into account common general knowledge of a person skilled in the art. Nonetheless, in the following, some exemplary implementation details are provided for the lookup unit 104, the client unit 102, the clearing unit 110 and the provider unit. However, it should be understood that the specific implementation details given are only exemplary and should not be considered as limiting.

In the following, exemplary implementation of a client unit 102 is provided. According to an embodiment, the client unit 102 is adapted for asking the user for a registered email address and a user password associated with this email address. According to an embodiment, the client unit is adapted for generating a fingerprint according to the SHA256 hash algorithm, creating a random cryptographic salt and creating the hashed version of the hashed user password salted with the cryptographic salt:

SHA256 (salt: SHA1 (user password))

The JSON encoded version is then:

```
{   emailHash: SHA256(email)
    passHashSalt: SALT
    passHashHash: SHA256(SALT:SHA1(password))
}
```

This fingerprint (hash code of the salted password hash) is then posted to the lookup unit 104 (e.g. to https://pls.regify.com/). After a successful response transmission, the client attains the remaining data

```
{
    providerUrl: https://regify.provider.com/
    status: OK
}
```

Hence, the client unit now can log into the provider unit 118 by using:

URL: https://regify.provider.com/Username:
email
Password: password

In case of an error, the client unit displays a dialog to the user indicating whether the error is credential-related in which case the user may re-enter the credentials. Otherwise, the dialog displayed to the user may indicate that the error is system-related in which case the user may be allowed to enter the provider network address (URL) and log in manually.

Having now regarded to the lookup unit 104, according to an embodiment, the lookup unit 104 maintains a database of provider identification data to provider network address (provider URL) mappings. A provider may add to the database of the lookup unit by running a web-based wizard on the provider unit.

According to an embodiment, the database of the lookup unit 104 contains a provider table which can be generated by the following structured query language (SQL) command:

```
CREATE TABLE 'tblproviders' (
    'PROVIDERID' varchar(16) NOT NULL,
    'PROVIDERURL' varchar(255) NOT NULL,
    PRIMARY KEY ('PROVIDERID')
) ENGINE=MyISAM DEFAULT CHARSET=utf8;
``` resulting in a provider table as shown in Table XVI:

TABLE XVI

Structure of a provider table stored at the lookup unit
tblproviders

| Column Name | Type | Description |
|---|---|---|
| PROVIDERID | varchar(16) | ID of provider such CH1 or LU2 |
| PROVIDERURL | varchar(256) | UTL of provider such as https://portal.regify.com/ |

This table is updated when a provider is registered by the lookup unit 104. The table is consulted for the provider network address during the lookup operation illustrated in FIG. 2 after the clearing unit 110 has provided provider identification data for a given fingerprint of user-specific data (e.g. for a given email hash).

According to an embodiment, all registration requests and lookup requests are logged for traceability and statistics management. According to an embodiment, the lookup unit is adapted for separating the prefix of the provider identification data from the remaining part of the provider identification data before creating the log record. An exemplary log table can be created with the following SQL commands:

```
CREATE TABLE 'tbllog' {
    'LOGID' bigint(20) NOT NULL AUTO_INCREMENT,
    'LOGDATE' timestamp NOT NULL DEFAULT CURRENT_TIMESTAMP,
    'LOGTYPE' tinyint(3) unsigned NOT NULL,
    'SRCIP' varchar(16) NOT NULL,
    'SRCCOUNTRY' varchar(6) NOT NULL DEFAULT '',
    'PROVIDERID' varchar(16) NOT NULL DEFAULT '',
    'CLEARINGPREFIX' varchar(6) NOT NULL DEFAULT '',
    'HASHCODE' varchar(255),
    'RESULT' tinyint(2) unsigned NOT NULL,
    'DETAILID' bigint(20) unsigned,
    PRIMARY KEY ('LOGID'),
    INDEX ('CLEARINGPREFIX', 'SRCCOUNTRY', 'HASHCODE')
) ENGINE=MyISAM DEFAULT CHARSET=utf8;
CREATE TABLE 'tbllogdetails' (
    'ID' bigint(20) NOT NULL AUTO_INCREMENT,
    'DETAIL' varchar(4092) NOT NULL,
    PRIMARY KEY ('ID')
) ENGINE=MyISAM DEFAULT CHARSET=utf8;
``` resulting in the following exemplary log table

TABLE XVII

Structure of a log table stored at the lookup unit
tbllog

| Column Name | Type | Description |
|---|---|---|
| LOGID | bigint(20) | Log id (primary index) |
| LOGDATE | timestamp | Time of event |
| LOGTYPE | unsigned tinyint | Type of event 1 = registerProvider2 = lookupProvider |
| SOURCEIP | varchar(16) | IP from which the request was made |
| SRCCOUNTRY | varchar(6) | GEOIP country of source ip. Example 'DE' |
| PROVIDERID | varchar(16) | Full provider id returned by lookup or registered via registration. Example: CH3 |
| CLEARINGPREFIX | varchar(6) | The prefix of the provider id without the provider id number. Example: CH |
| HASHCODE | varchar(255) | Hash code of email to look up |
| RESULT | tinyint(2) | Result of the operation 1 = OK 2 = INVALID 3 = NOSUPPORT 9 = ERROR |
| DETAILID | Bigint(20) unsigned | Optional detail id referencing the tbllogdetails.ID column. Used when result != 1(OK). |

Example entries of the log table in Table XVII for successful provider registration and successful lookup requests are given in the following:

TABLE XVIII

Example entries of the log table in Table XVII

| LOGTYPE | SOURCEIP | SRCCOUNTRY | PROVIDER ID | CLEARING PREFIX | HASHCODE | RESULT | DETAILID |
|---|---|---|---|---|---|---|---|
| 1 | 1.2.3.4 | DE | CH3 | CH |  | 1 |  |
| 2 | 5.6.7.8 | LU | CH3 | CH | DEAD... | 1 |  |

Respective examples of log entries of a failed registration request and failed lookup request may be as follows:

TABLE XIX

Example entries of the log table in Table XVII

| LOGTYPE | SOURCEIP | SRCCOUNTRY | PROVIDER ID | CLEARING PREFIX | HASHCODE | RESULT | DETAILID |
|---|---|---|---|---|---|---|---|
| 1 | 1.2.3.4 | DE | CH3 | CH |  | 2, 3 or 9 | 1 |
| 2 | 5.6.7.8 | LU | CH3 | CH | DEAD... | 2, 3 or 9 | 2 |

The error detail responses include the response from every clearing unit queried. It is noted that a number of n clearing units may be provided and queried by the lookup unit 104. Exemplary error detail responses are as follows:

TABLE XX

Detailed error responses of a plurality of clearing units

| ID | DETAIL |
|---|---|
| 1 | data= { "op": "verifyProvider", "providerId": "2", "secretSalt": "bar...", "secretHash": "987ADDED..." }<br>192.23.10.34 RESPONSE = { "status": "INVALID / ERROR" , "DESC" : "foo is broken"}<br>...<br>192.23.20.45 RESPONSE = { "status": "INVALID / ERROR" , "DESC" : "foo is broken"} |
| 2 | data={ "op": "lookupProvider", "emailHash": "123DEAD...", "passHashSalt" : "bar...", "passHashHash" : "987ADDED..." }<br>192.23.10.34 RESPONSE = { "status": "INVALID / ERROR" , "DESC" : "foo is broken"}<br>...<br>192.23.20.45 RESPONSE = { "status": "OK" , "providerId" : "CH3"}<br>regify.provider.com/pls.php RESPONSE ={ "status" : "INVALID"} |

Since lookup requests for a newly registered user may require querying several clearing units, lookup tables that associate clearing units with country of origin of the lookup request according to GeoIP is maintained. GeoIP is a service accessible via the Internet which allows to determine the geographic location of a server by providing the servers network address (IP address). A nightly job or the absence of the PHP file can update these table structures. The lookup unit 104 will then start verifying email hashes with the clearing unit that has the most success rates in the requestor's country of origin. The following SQL query, subject to optimization, can be used on the log table "TBL log" to extract a list of providers that service unique email hashes in a given country:

```
select SRCCOUNTRY, CLEARINGPREFIX, count(SRCCOUNTRY)
AS 'COUNT'
    from {
            select distinct SRCCOUNTRY, CLEARINGPREFIX,
            HASHCODE from tbllog where
LOGTYPE=2 and 'RESULT'=1
)       as list group by SRCCOUNTRY, CLEARINGPREFIX ORDER
BY SRCCOUNTRY, 'COUNT' DESC;
```

The result can then be processed by code and written e.g. to a PHP file containing a hash/list representation of clearing unit order. Clearing prefixes not found in the query are appended according to an embodiment. According to an embodiment, there is also a default search order in case the country of origin isn't in the hash map yet. Below an example representation of such a data structure is given:

```
$lookup = array  ('DE'      => array('CH', 'LU', 'UK'),
                  'LU'      => array('LU', 'CH', 'UK'),
                  'default' => array('CH', 'LU', 'UK')
         );
```

According to an embodiment, the functionality of the clearing unit 110 as disclosed herein is provided to an existing clearing unit by providing a new software application called for example PLS.PHP. According to an embodiment, this app will only respond to requests with a valid PLS password to be specified in the respective request transmission 136, 232 to the clearing unit. For example, according to an embodiment, the PLS password is specified as the value of "PLSpass" in the respective JSON structure. According to an embodiment, each clearing unit has exactly one PLS password that must match the ones in the requests. According to a further embodiment, each clearing unit will handle three operations which are specified in the operations field of the posted JSON structure.

Next, an exemplary implementation for a provider lookup function is given. The most commonly used function of the clearing unit is the "lookup provider" function which is for example initiated by a respective request transmission 136 from the lookup unit 104 to the clearing unit 110. According to an embodiment, this "lookup provider" function will look up the associated provider identification data for a given fingerprint of user-specific data (e.g. email hash). The logic involved is basically a SQL query in the form of:

select IDENTIFIER from tblprovidermail where MAILHASH='345F5C57C4AA49C8066537C2FE68 C197DA4864381AF6486A28EC301D5F659D4F' and STATE=0

According to an embodiment, the clearing unit 110 and the lookup unit 104 are adapted so as to recognize that if the result set is empty, then the result will be a status: "invalid". Else it will be status: "ok" and the field "provider ID" will contain the found provider identification data such as "DE6". A response could look like:

```
{
    providerId: CH2
    status: OK
}
```

In the following, an exemplary implementation of provider verification is described. The other operation is used when a provider registers himself with the lookup unit 104 to verify that it is legitimate. This operation (op) is called "verify provider" in an embodiment. The JSON data structure in an exemplary implementation is:

```
data= {
    op: verifyProvider
    providerId: 2
    secretSalt: bar...
    secretHash: 987ADDEI
    plsPass: DSEF53...
}
```

Here the clearing server verifies that the part of the provider identification data ("provider ID: 2") indeed ends up with the fingerprint of the verification data ("secret hash") when hashing the given cryptographic salt "secret salt" with the verification data "secret". Upon success the clearing unit 110 will return to the lookup unit 104:

```
{
    prefix: CH
    status: OK
}
```

According to an embodiment, the clearing unit 110 is adapted for receiving a check request from the lookup unit, the check request allowing a checking whether the clearing unit 110 is in good running condition. The check request might be as follows:

```
Data= {
    op: check
    plsPass: DSEF53...
}
```

Having now regard to the provider unit, it is noted that according to an embodiment the registration of the provider may be performed via a web-based wizard. An implementation of the provider unit of a network system according to embodiments of the herein disclosed subject matter, e.g. of a provider lookup protocol as exemplarily shown in FIG. 2, may also be performed by employing SQL databases and PHP apps. However, other implementations of embodiments of the herein disclosed subject matter are also possible, for the provider unit as well as for the other units, e.g. the client unit, the lookup unit and the clearing unit.

Having regard to the embodiments disclosed herein, it is noted that in different communications different user specific data (or data derived therefrom) may be exchanged. For example for the lookup request from the client unit to the lookup unit, e-mail address and user password may be used as basis for the user-related data and the further user-related data and only the e-Mail address may be used as basis for the user-related data in the communication from the lookup unit and the clearing unit.

It should be understood that the use of salted fingerprints requires adaption of the involved units. E.g. if a salted fingerprint of the password hash is used, the provider unit requires respective adaption to be able to verify the salted fingerprint. For example, for verifying that the salted fingerprint of the password received from the lookup unit corresponds to the respective password stored at the provider unit, the provider unit may be adapted for calculating a fingerprint of the password stored at the provider unit, combine the fingerprint with the cryptographic salt and calculate a final fingerprint of the thus salted fingerprint. It is understood that the method implemented for calculating the final fingerprint must be the same in the involved units, e.g. in the client unit and the provider unit in the aforementioned example, in order to allow verification whether or not the data on the basis which the fingerprints are calculated are identical or not.

While the transmissions between units according to embodiments of the herein disclosed subject matter are sometimes described as to include an operation parameter indicating the operation to be carried out, it should be understood that such a operation parameter may be omitted according to an embodiment. For example, the respective unit may be adapted for carrying out a specific action if a transmission with a predefined data structure is received by the unit. Such a predefined data structure may be the same as data structure described with regard to embodiments of the herein disclosed subject matter, with the exception that the operating parameter is omitted in the data structure.

Although some embodiments are described with reference to different entities or units, it should be understood that the respective features of each one of the entities or units may be implemented independently from the features of the other entities or units unless the other features are mandatory for the one feature.

According to an embodiment, the clearing unit permanently stores secret data, such as identification data associated with user-related data, but provides such data only upon request by the lookup unit. In other words, according to an embodiment, the clearing unit does not initiate communication with other units, it only responds. Thereby the security is increased. Accordingly and in accordance with an embodiment, the active entity is the lookup unit.

While in description of the drawings a specific sequence for actions (e.g. checks 139, 146, 152, 164, 170, 179, 192, 198) is specified, it should be understood that such an exemplary sequence shall not to be considered as limiting. The skilled person will understand that many of the described actions may be executed in a different sequence or even that no specific sequence would be necessary, for example in case of parallel execution of some actions disclosed herein where the waiting entity (function, unit, or subsequent action) may just wait until the necessary actions are completed.

While some embodiments relate to initialization of parameters of data structures, e.g. JSON descriptions, it should be understood that such a procedure is only one possibility of performing respective transmissions of information, information elements and parameter values from one unit to another unit.

While in some exemplary cases reference is made to a parameter value and a further parameter value (e.g. to configuration related data and further configuration related data), it should be understood that such examples shall not be considered as limiting the disclosed subject matter in regard of the number of parameter values. In particular, in addition to the disclosed two parameters (parameter values) in such cases methods and devices as disclosed herein may be adapted for operating with only a single parameter (parameter value) or for operating with three or more parameters (parameter values).

It is noted that in cases where specific embodiments of the herein disclosed subject matter are described with regard to entity-related data in the form of a fingerprint (e.g. user-related data in the form of a fingerprint of user-specific data), it should be understood that according to more general embodiments the respective entity-related data are used instead of the fingerprint explicitly disclosed (i.e. the embodiment may also be realized by referring to user-related data which are based on the user-specific data instead of referring to the fingerprint of the user-specific data).

Communication between units according to embodiments of the herein disclosed subject matter may be performed over any suitable connection/suitable network, e.g. over the internet, a local area network (LAN), a wide area network (WAN), a cellular network, etc.

It should further be noted that an entity or unit as disclosed herein is not limited to a dedicated entity as described in some embodiments. Rather, the herein disclosed subject matter may be implemented in various ways in various locations in the network system while still providing the desired functionality.

According to embodiments of the invention, any suitable entity (e.g. components, units and devices) disclosed herein, e.g. the client unit, the lookup unit, the clearing unit and the provider unit, are at least in part provided in the form of respective computer programs which enable a processor device to provide the functionality of the respective entities as disclosed herein. According to other embodiments, any suitable entity disclosed herein may be provided in hardware. According to other—hybrid—embodiments, some entities may be provided in software while other entities are provided in hardware.

It should be noted that any entity disclosed herein (e.g. components, units and devices) are not limited to a dedicated entity as described in some embodiments. Rather, the herein disclosed subject matter may be implemented in various ways and with various granularity on device level or software module level while still providing the desired functionality. Further, it should be noted that according to embodiments a separate entity (e.g. a software module, a hardware module or a hybrid module (i.e. a combined software/hardware module)) may be provided for each of the functions disclosed herein. According to other embodiments, an entity (e.g. a software module, a hardware module or a hybrid module) is configured for providing two or more functions as disclosed herein. According to an embodiment, each unit is associated with a processor device including at least one processor for carrying out at least one computer program for providing the functionality of the unit according to one or more embodiments of the herein disclosed subject matter.

It should be noted that the term "comprising" does not exclude other elements or steps and the "a" or "an" does not exclude a plurality. Further, the term "using" (some data) does not exclude using in addition hereto other data. Also elements described in association with different embodiments may be combined. It should also be noted that reference signs in the claims should not be construed as limiting the scope of the claims.

In order to recapitulate the above described embodiments of the present invention one can state:

There is provided a network system 100 comprising, in accordance with an embodiment, a lookup unit 104, a clearing unit 110 having a storage device and a client unit 102. The client unit 102 is adapted for providing user-related data 106 to the lookup unit 104, wherein the user-related data 106 is based on user-specific data, the user-specific data is associated with a user, and the user-related data 106 allows for unambiguous identification of the user-specific data. Further, the lookup unit is adapted for retrieving identification data 114 from the clearing unit 110 by using the user-related data 106, wherein the identification data 114 is associated with the user-specific data 106, and the clearing unit 110 is adapted for retrieving from the storage device the identification data 114 associated with the user-specific data. The clearing unit 110 is adapted for providing the identification data 114 to the lookup unit 104. The lookup unit 104 is adapted for retrieving configuration related data 115 for a service provided to the user, wherein the configuration related data 115 are retrieved by using the identification data 114.

The invention claimed is:

1. A network system capable of separating a retrieval of configuration related data for a user-specific service and an identification of a corresponding user, the network system comprising:
   a lookup unit;
   a clearing unit having a storage device;
   a provider unit; and
   a client unit being adapted for transmitting user-related data to the lookup unit, the user-related data being based on user-specific data, the user-specific data being associated with a user and unambiguously identifying the user, and the user-related data allowing for unambiguous identification of the user-specific data, and the user-related data being a first fingerprint of the user-specific data;
   the lookup unit being further adapted for transmitting a second fingerprint of the user-specific data to the clearing unit, the second fingerprint being based on the first fingerprint of the user-specific data, the second fingerprint allowing for unambiguous identification of the user-specific data;
   the lookup unit being adapted for retrieving identification data from the clearing unit by using the second fingerprint, the identification data unambiguously identifying the provider unit associated with the user-specific data;
   the clearing unit being adapted for selecting and retrieving from the storage device the identification data by using the second fingerprint of the user-specific data;
   the clearing unit being adapted for transmitting the identification data to the lookup unit;
   the lookup unit being adapted for retrieving the configuration related data from the provider unit for a service provided to the user by using the identification data, the configuration related data including address information of the provider unit;
   the lookup unit further being adapted for transmitting the configuration related data to the client unit;
   the client unit being adapted for using the configuration related data to establish connection to the provider unit;
   the clearing unit and the lookup unit being different from each other; and
   the lookup unit, the clearing unit, the provider unit, and the client unit each being implemented by respective processor device having at least one processor.

2. The network system according to claim 1, further comprising
   the lookup unit being further adapted for providing a third fingerprint of the user-specific data to the provider unit for verifying, by the provider unit, validity of the user-specific data by using the third fingerprint;
   the provider unit being implemented by a processor device having at least one processor; and
   the provider unit being optionally adapted for providing a status information regarding the validity of the user-specific data to the lookup unit;
   wherein optionally the third fingerprint is identical to the first fingerprint.

3. The network system according to claim 1, further comprising
   the client unit being further adapted for providing further user-related data to the lookup unit, the further user-related data being based on further user-specific data, the further user-specific data being associated with the user, and the further user-related data allowing for unambiguous identification of the further user-specific data;
   the lookup unit being further adapted for providing data, which is based on the further user-related data, to the provider unit and receiving in response hereto a status information regarding the validity of the further user-specific data.

4. The network system according to claim 1, further comprising
   the provider unit being adapted for providing a registration request to the lookup unit, the registration request including at least part of the identification data and a verification-related data, the verification-related data being based on verification data and wherein the verification-related data allows for unambiguous identification of the verification data;
   the lookup unit being further adapted for receiving the registration request; the lookup unit being further adapted for providing to the clearing unit the at least part of the provider identification data and data which is based on the verification-related data and allows for unambiguous identification of the verification data.

5. The network system according to claim 1,
the client unit being further adapted for initiating a configuration of the service provided to a user by providing the user-related data to the lookup unit.

6. The network system according to claim 1, the clearing unit being further adapted for receiving the second fingerprint from the lookup unit of the network system.

7. The network system according to claim 2,
the provider unit being adapted for receiving the third fingerprint of the user-related data from the lookup unit;
the provider unit being further adapted for
verifying validity of the user-specific data by using the third fingerprint and/or
retrieving the configuration related data associated with the user-specific data.

8. A lookup unit of a network system which is capable of separating a retrieval of configuration related data for a user-specific service and an identification of a corresponding user,
the lookup unit being adapted for receiving user-related data from a client unit, wherein the user-related data is based on user-specific data, the user-specific data is associated with a user and unambiguously identifying the user, the user-related data allows for unambiguous identification of the user-specific data, and the user-related data being a first fingerprint of the user-specific data;
the lookup unit being further adapted for transmitting a second fingerprint of the user-specific data to a clearing unit having a storage device, the second fingerprint being based on the first fingerprint of the user-specific data, the second fingerprint allowing for unambiguous identification of the user-specific data;
the lookup unit being adapted for retrieving identification data from the clearing unit, which is different from the lookup unit, by using the second fingerprint, the identification data unambiguously identifying a provider unit associated with the user-specific data, wherein the clearing unit selects and retrieves from the storage device the identification data by using the second fingerprint of the user-specific data;
the lookup unit being adapted for retrieving the configuration related data from the provider unit for a service provided to the user by using the identification data, the configuration related data including address information of the provider unit; and
the lookup unit further being adapted for transmitting the configuration related data to the client unit, wherein the client unit uses the configuration related data to establish connection to the provider unit;
the lookup unit, the clearing unit, the provider unit, and the client unit each being implemented by respective processor device having at least one processor.

9. A method of operating a network system capable of separating a retrieval of configuration related data for a user-specific service and an identification of a corresponding user, the network system comprising a lookup unit, a clearing unit having a storage device, a provider unit, and a client unit, the clearing unit and the lookup unit being different from each other, the method comprising:
transmitting user-related data from the client unit to the lookup unit, the user-related data being based on user-specific data, the user-specific data being associated with a user and unambiguously identifying the user, the user-related data allowing for unambiguous identification of the user-specific data, and the user-related data being a first fingerprint of the user-specific data;
operating the lookup unit so as to transmit a second fingerprint of the user-specific data to the clearing unit, the second fingerprint being based on the first fingerprint of the user-specific data, the second fingerprint allowing for unambiguous identification of the user-specific data;
operating the lookup unit so as to retrieve identification data from the clearing unit by using the second fingerprint, the identification data unambiguously identifying the provider unit associated with the user-specific data;
operating the clearing unit so as to select and retrieve from the storage device the identification data by using the second fingerprint of the user-specific data;
transmitting the identification data from the clearing unit to the lookup unit;
operating the lookup unit so as to retrieve configuration related data from the provider unit for a service provided to the user by using the identification data, the configuration related data including address information of the provider unit; and
operating the lookup unit so as to transmit the configuration related data to the client unit;
operating the client unit so as to use the configuration related data to establish connection to the provider unit;
the lookup unit, the clearing unit, the provider unit, and the client unit each being implemented by respective processor device having at least one processor.

10. The method of according to claim 9, the method further comprising operating the client unit, wherein the operating of the client unit comprises:
initiating a configuration of the service provided to the user by providing the user-related data to the lookup unit; and
receiving from the lookup unit the configuration related data for the service.

11. The method according to claim 9, the method further comprising operating the clearing unit, wherein the operating of the clearing unit comprises:
receiving the second fingerprint from the lookup unit of the network system;
selecting the identification data associated with the user-specific data by using the second fingerprint of the user-specific data;
providing the identification data to the lookup unit.

12. The method according to claim 9, the method further comprising operating the provider unit, wherein the operating of the provider unit comprises:
receiving the third fingerprint from the lookup unit;
verifying validity of the user-specific data by using the third fingerprint and/or retrieving the configuration related data associated with the user-specific data; and
optionally providing a status information and/or the configuration related data to the lookup unit, the status information being indicative of a validity of the user-specific data corresponding to the third fingerprint.

13. A method of operating a lookup unit of a network system which is capable of separating a retrieval of configuration related data for a user-specific service and an identification of a corresponding user, the method comprising:
receiving user-related data from a client unit, wherein the user-related data is based on user-specific data, the user-specific data is associated with a user and unambiguously identifying the user, the user-related data allows for unambiguous identification of the user-specific data, and the user-related data is a first fingerprint of the user-specific data;

transmitting a second fingerprint of the user-specific data to a clearing unit having a storage device, the clearing unit being different from the lookup unit, the second fingerprint being based on the first fingerprint of the user-specific data, the second fingerprint allowing for unambiguous identification of the user-specific data;

retrieving identification data from the clearing unit by using the second fingerprint, the identification data unambiguously identifying a provider unit associated with the user-specific data, wherein the clearing unit selects and retrieves from the storage device the identification data by using the second fingerprint of the user-specific data;

retrieving the configuration related data from the provider unit for a service provided to the user by using the identification data, the configuration related data including address information of the provider unit; and transmitting the configuration related data to the client unit, wherein the client unit uses the configuration related data to establish connection to the provider unit;

the lookup unit, the clearing unit, the provider unit, and the client unit each being implemented by respective processor device having at least one processor.

14. A non-transitory computer readable medium containing instructions for, when executed by a processor device, controlling a method of operating a network system capable of separating a retrieval of configuration related data for a user-specific service and an identification of a corresponding user, the network system comprising a lookup unit, a clearing unit having a storage device, a provider unit, and a client unit, the clearing unit and the lookup unit being different from each other, the method comprising:

transmitting user-related data from the client unit to the lookup unit, the user-related data being based on user-specific data, the user-specific data being associated with a user and unambiguously identifying the user, the user-related data allowing for unambiguous identification of the user-specific data, and the user-related data being a first fingerprint of the user-specific data;

operating the lookup unit so as to transmit a second fingerprint of the user-specific data to the clearing unit, the second fingerprint being based on the first fingerprint of the user-specific data, the second fingerprint allowing for unambiguous identification of the user-specific data;

operating the lookup unit so as to retrieve identification data from the clearing unit by using the second fingerprint, the identification data unambiguously identifying the provider unit associated with the user-specific data;

operating the clearing unit so as to select and retrieve from the storage device the identification data by using the second fingerprint of the user-specific data;

transmitting the identification data from the clearing unit to the lookup unit; operating the lookup unit so as to retrieve configuration related data from the provider unit for a service provided to the user by using the identification data, the configuration related data including address information of the provider unit; and operating the lookup unit so as to transmit the configuration related data to the client unit;

operating the client unit so as to use the configuration related data to establish connection to the provider unit;

the lookup unit, the clearing unit, the provider unit, and the client unit each being implemented by respective processor device having at least one processor.

15. A non-transitory computer readable medium according to claim 14, the instructions being further configured for, when executed by a processor device, controlling operating the client unit, wherein the operating of the client unit comprises:

initiating a configuration of the service provided to the user by providing the user-related data to the lookup unit; and receiving from the lookup unit the configuration related data for the service.

16. The non-transitory computer readable medium according to claim 14, the instructions being further configured for, when executed by a processor device, controlling operating the clearing unit, wherein the operating of the clearing unit comprises:

receiving the second fingerprint from the lookup unit of the network system;

selecting the identification data associated with the user-specific data by using the second fingerprint of the user-specific data;

providing the identification data to the lookup unit.

17. The non-transitory computer readable medium according to claim 14, the instructions being further configured for, when executed by a processor device, controlling operating the provider unit, wherein the operating of the provider unit comprises:

receiving the third fingerprint from the lookup unit;

verifying validity of the user-specific data by using the third fingerprint and/or retrieving the configuration related data associated with the user-specific data; and optionally providing a status information and/or the configuration related data to the lookup unit, the status information being indicative of a validity of the user-specific data corresponding to the third fingerprint.

18. A non-transitory computer readable medium containing instructions for, when executed by a processor device, controlling a method of operating a lookup unit of a network system which is capable of separating a retrieval of configuration related data for a user-specific service and an identification of a corresponding user, the method comprising:

receiving user-related data from a client unit, wherein the user-related data is based on user-specific data, the user-specific data is associated with a user and unambiguously identifying the user, the user-related data allows for unambiguous identification of the user-specific data, and the user-related data is a first fingerprint of the user-specific data;

transmitting a second fingerprint of the user-specific data to a clearing unit having a storage device, the clearing unit being different from the lookup unit, the second fingerprint being based on the first fingerprint of the user-specific data, the second fingerprint allowing for unambiguous identification of the user-specific data;

retrieving identification data from the clearing unit by using the second fingerprint, the identification data unambiguous identifying a provider unit associated with the user-specific data, wherein the clearing unit selects and retrieves from the storage device the identification data by using the second fingerprint of the user-specific data;

retrieving the configuration related data from the provider unit for a service provided to the user by using the identification data, the configuration related data including address information of the provider unit; and transmitting the configuration related data to the client unit, wherein the client unit uses the configuration related data to establish connection to the provider unit;
the lookup unit, the clearing unit, the provider unit, and the client unit each being implemented by respective processor device having at least one processor.

* * * * *